United States Patent
Tsukamoto et al.

(10) Patent No.: US 11,962,192 B2
(45) Date of Patent: Apr. 16, 2024

(54) ELECTRIC MOTOR, COMPRESSOR, AND AIR CONDITIONER

(71) Applicant: Mitsubishi Electric Corporation, Tokyo (JP)

(72) Inventors: Emi Tsukamoto, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 296 days.

(21) Appl. No.: 17/626,880

(22) PCT Filed: Jul. 30, 2019

(86) PCT No.: PCT/JP2019/029785
§ 371 (c)(1),
(2) Date: Jan. 13, 2022

(87) PCT Pub. No.: WO2021/019673
PCT Pub. Date: Feb. 4, 2021

(65) Prior Publication Data
US 2022/0263362 A1    Aug. 18, 2022

(51) Int. Cl.
*H02K 1/276* (2022.01)
*F25B 31/02* (2006.01)
(Continued)

(52) U.S. Cl.
CPC ......... *H02K 1/2766* (2013.01); *F25B 31/026* (2013.01); *H02K 21/16* (2013.01);
(Continued)

(58) Field of Classification Search
CPC ...... H02K 1/2766; H02K 21/16; H02K 29/03; F25B 31/026
See application file for complete search history.

(56) References Cited

U.S. PATENT DOCUMENTS

2011/0285241 A1    11/2011   Chamberlin et al.
2019/0006896 A1*    1/2019   Baba ................. H02K 1/278

FOREIGN PATENT DOCUMENTS

CN    102906967 A     1/2013
JP    2000-116042 A   4/2000
(Continued)

OTHER PUBLICATIONS

JP-2009106001-A_translate (Year: 2009).*
(Continued)

*Primary Examiner* — Tulsidas C Patel
*Assistant Examiner* — Mohammed Ahmed Qureshi
(74) *Attorney, Agent, or Firm* — POSZ LAW GROUP, PLC

(57) ABSTRACT

An electric motor includes: a permanent magnet; a rotor including a first rotor core having a first electrical steel sheet and a second rotor core having a second electrical steel sheet; and a stator including a stator core. The first electrical steel sheet is located outside the stator core. A relationship among a minimum width BL1 of a first left bridge, a thickness tL1 of the first left bridge, a minimum width BR1 of a first right bridge, a thickness tR1 of the first right bridge, a minimum width BL2 of a second left bridge, a thickness tL2 of the second left bridge, a minimum width BR2 of a second right bridge, and a thickness tR2 of the second right bridge satisfies (BL1×tL1+BR1×tR1)>(BL2×tL2+BR2×tR2).

18 Claims, 11 Drawing Sheets

(51) Int. Cl.
*H02K 21/16* (2006.01)
*F04D 25/06* (2006.01)
*H02K 29/03* (2006.01)

(52) U.S. Cl.
CPC .......... *F04D 25/0606* (2013.01); *H02K 29/03* (2013.01); *H02K 2213/03* (2013.01)

(56) References Cited

FOREIGN PATENT DOCUMENTS

| | | | |
|---|---|---|---|
| JP | 2008-199833 A | | 8/2008 |
| JP | 2009-106001 A | | 5/2009 |
| JP | 2009106001 A | * | 5/2009 |
| JP | 2010-226830 A | | 10/2010 |
| JP | 2011-004480 A | | 1/2011 |
| JP | 2014-079068 A | | 5/2014 |
| JP | 2015-023680 A | | 2/2015 |
| JP | 2016-197991 A | | 11/2016 |
| JP | 2017-189003 A | | 10/2017 |
| JP | 2017189003 A | * | 10/2017 |
| WO | 2017/138142 A1 | | 8/2017 |

OTHER PUBLICATIONS

JP-2017189003-A_translate (Year: 2017).*
International Search Report dated Sep. 24, 2019, issued in corresponding International Patent Application No. PCT/JP2019/029785 (and English Machine Translation).
Office Action dated Apr. 17, 2023 in connection with counterpart Chinese Patent Application No. 201980098633.1 (and English machine translation).
Office Action issued on Nov. 28, 2023 in connection with counterpart Chinese Patent Application No. 201980098633.1 (and English machine translation).

* cited by examiner

ELECTRIC MOTOR, COMPRESSOR, AND AIR CONDITIONER

CROSS REFERENCE TO RELATED APPLICATION

This application is a U.S. National Stage Application of International Patent Application No. PCT/JP2019/029785 filed on Jul. 30, 2019, the disclosure of which is incorporated herein by reference.

TECHNICAL FIELD

The present invention relates to an electric motor.

BACKGROUND

In a proposed structure, spaces are provided on both ends of permanent magnets of a rotor of an electric motor in order to reduce magnetic flux leakage in the rotor (e.g., leakage of magnetic flux from permanent magnets of magnetic pole parts of the rotor to adjacent magnetic pole parts) (see, for example, Patent Reference 1).

PATENT REFERENCE

Patent Reference 1: Japanese Patent Application Publication No. 2016-197991

Magnetic flux leakage can be reduced as the width of a bridge provided between an end of a magnet insertion hole and the outer peripheral surface of the rotor decreases, but a mechanical strength of the rotor to a centrifugal force generated in the rotor decreases as the width of the bridge decreases. On the other hand, as the width of the bridge increases, the mechanical strength of the rotor to the centrifugal force generated in the rotor can be increased, but magnetic flux leakage increases as the width of the bridge increases. Consequently, efficiency of the electric motor decreases.

SUMMARY

It is therefore an object of the present invention to solve the problems described above and enhance efficiency of an electric motor.

A motor according to an aspect of the present invention includes:
- a rotor including at least one permanent magnet, a first rotor core having a first electrical steel sheet, and a second rotor core having a second electrical steel sheet, the rotor having a magnetic pole part formed by the at least one permanent magnet; and
- a stator including a stator core and a winding fixed to the stator core, the stator being disposed outside the rotor, wherein
- the first electrical steel sheet is located outside the stator core in an axial direction of the rotor,
- the first electrical steel sheet includes
- a first left flux barrier part and a first right flux barrier part respectively provided on both sides of the magnetic pole part in a circumferential direction of the rotor, in a plane perpendicular to the axial direction,
- a first left bridge provided between the first left flux barrier part and an outer peripheral surface of the first rotor core, and
- a first right bridge provided between the first right flux barrier part and the outer peripheral surface of the first rotor core,
- the second electrical steel sheet includes
- a second left flux barrier part and a second right flux barrier part respectively provided on both sides of the magnetic pole part in the circumferential direction, in the plane,
- a second left bridge provided between the second left flux barrier part and an outer peripheral surface of the second rotor core, and
- a second right bridge provided between the second right flux barrier part and the outer peripheral surface of the second rotor core, and
- the electric motor satisfies $$BL1>BL2, BR1>BR2, \text{ and } (BL1 \times tL1+BR1 \times tR1) > (BL2 \times tL2+BR2 \times tR2),$$

where $BL1$ is a minimum width of the first left bridge in the plane, $tL1$ is a thickness of the first left bridge in the axial direction, $BR1$ is a minimum width of the first right bridge in the plane, $tR1$ is a thickness of the first right bridge in the axial direction, $BL2$ is a minimum width of the second left bridge in the plane, $tL2$ is a thickness of the second left bridge in the axial direction, $BR2$ is a minimum width of the second right bridge in the plane, and $tR2$ is a thickness of the second right bridge in the axial direction.

An electric motor according to another aspect of the present invention includes:
- a rotor including at least one permanent magnet, a first rotor core having a first electrical steel sheet, and a second rotor core having a second electrical steel sheet, the rotor having a magnetic pole part formed by the at least one permanent magnet; and
- a stator including a stator core and a winding fixed to the stator core, the stator being disposed outside the rotor, wherein
- the first electrical steel sheet is located outside the stator core in an axial direction of the rotor,
- the first electrical steel sheet includes
- a first left flux barrier part and a first right flux barrier part respectively provided on both sides of the magnetic pole part in a circumferential direction of the rotor, in a plane perpendicular to the axial direction,
- a first left bridge provided between the first left flux barrier part and an outer peripheral surface of the first rotor core, and
- a first right bridge provided between the first right flux barrier part and the outer peripheral surface of the first rotor core,
- the second electrical steel sheet includes
- a second left flux barrier part and a second right flux barrier part respectively provided on both sides of the magnetic pole part in the circumferential direction, in the plane,
- a second left bridge provided between the second left flux barrier part and an outer peripheral surface of the second rotor core, and
- a second right bridge provided between the second right flux barrier part and the outer peripheral surface of the second rotor core, and
- the electric motor satisfies $$(BL1 \times tL1+BR1 \times tR1) > (BL2 \times tL2+BR2 \times tR2),$$

where $BL1$ is a minimum width of the first left bridge in the plane, $tL1$ is a thickness of the first left bridge in the axial direction, BR1 is a minimum width of the first right bridge in the plane, tR1 is a thickness of the first right bridge in the axial direction, BL2 is a minimum width of the second left bridge in the plane, tL2 is a thickness of the second left bridge in the axial direction, BR2 is a minimum width of the second right bridge in the plane, and tR2 is a thickness of the second right bridge in the axial direction, wherein the at least one permanent magnet increases two permanent magnets, the first electrical steel sheet includes a first center bridge provided between the two permanent magnets, the second electrical steel sheet includes a second center bridge provided between the two permanent magnets, and the electric motor satisfies $$(BL1 \times tL1 + BR1 \times tR1 + BC1 \times tC1) > (BL2 \times tL2 + BR2 \times tR2 + BC2 \times tC2),$$

where BC1 is a minimum width of the first center bridge in the plane, tC1 is a thickness of the first center bridge in the axial direction, BC2 is a minimum width of the second center bridge in the plane, and tC2 is a thickness of the second center bridge in the axial direction, wherein the electric motor satisfies BL1=BL2=BR1=BR2=BC1=BC2, tL1>tL2, tR1>tR2, and tC1>tC2.

An electric motor according to another aspect of the present invention includes:
  a rotor including two permanent magnets, a first rotor core having a first electrical steel sheet, and a second rotor core having a second electrical steel sheet, the rotor having a magnetic pole part formed by the two permanent magnets; and
  a stator including a stator core and a winding fixed to the stator core, the stator being disposed outside the rotor, wherein
  the first electrical steel sheet is located outside the stator core in an axial direction of the rotor,
  the first electrical steel sheet includes
  a first left flux barrier part and a first right flux barrier part respectively provided on both sides of the magnetic pole part in a circumferential direction of the rotor, in a plane perpendicular to the axial direction,
  a first left bridge provided between the first left flux barrier part and an outer peripheral surface of the first rotor core, and
  a first right bridge provided between the first right flux barrier part and the outer peripheral surface of the first rotor core, and
  a first center bridge provided between the two permanent magnets,
  the second electrical steel sheet includes
  a second left flux barrier part and a second right flux barrier part respectively provided on both sides of the magnetic pole part in the circumferential direction in the plane, and
  a second center bridge provided between the two permanent magnets,
  the second rotor core includes a plurality of outer peripheral surfaces that are separated from one another, and
  the electric motor satisfies $$BC1 > BC2,$$

where BC1 is a minimum width of the first center bridge in the plane and BC2 is a minimum width of the second center bridge in the plane.

An electric motor according to yet another aspect of the present invention includes:
  a rotor including two permanent magnets, a first rotor core having a first electrical steel sheet, and a second rotor core having a second electrical steel sheet, the rotor having a magnetic pole part formed by the two permanent magnets; and
  a stator including a stator core and a winding fixed to the stator core, the stator being disposed outside the rotor, wherein
  the first electrical steel sheet is located outside the stator core in an axial direction of the rotor,
  the first electrical steel sheet includes
  a first left flux barrier part and a first right flux barrier part respectively provided on both sides of the magnetic pole part in a circumferential direction of the rotor, in a plane perpendicular to the axial direction,
  a first left bridge provided between the first left flux barrier part and an outer peripheral surface of the first rotor core,
  a first right bridge provided between the first right flux barrier part and the outer peripheral surface of the first rotor core, and
  a first center bridge provided between the two permanent magnets,
  the second electrical steel sheet includes
  a second left flux barrier part and a second right flux barrier part respectively provided on both sides of the magnetic pole part in the circumferential direction in the plane, and
  a bridge provided between the second right flux barrier part and an outer edge of the second rotor core, the second right flux barrier part being provided on an upstream side in a rotation direction of the rotor,
  the second rotor core includes a plurality of outer peripheral surfaces that are separated from one another, and
  the electric motor satisfies $$BR1 > BR2,$$

where BR1 is a minimum width of the first right bridge in the plane and BR2 is a minimum width of the bridge of the second electrical steel sheet in the plane.

A compressor according to still another aspect of the present invention includes:
  a closed container;
  a compression device disposed in the closed container; and
  the electric motor to drive the compression device.

An air conditioner according to still another aspect of the present invention includes:
  the compressor; and
  a heat exchanger.

According to the present invention, efficiency of the electric motor can be enhanced.

DETAILED DESCRIPTION

First Embodiment

Figure 1:
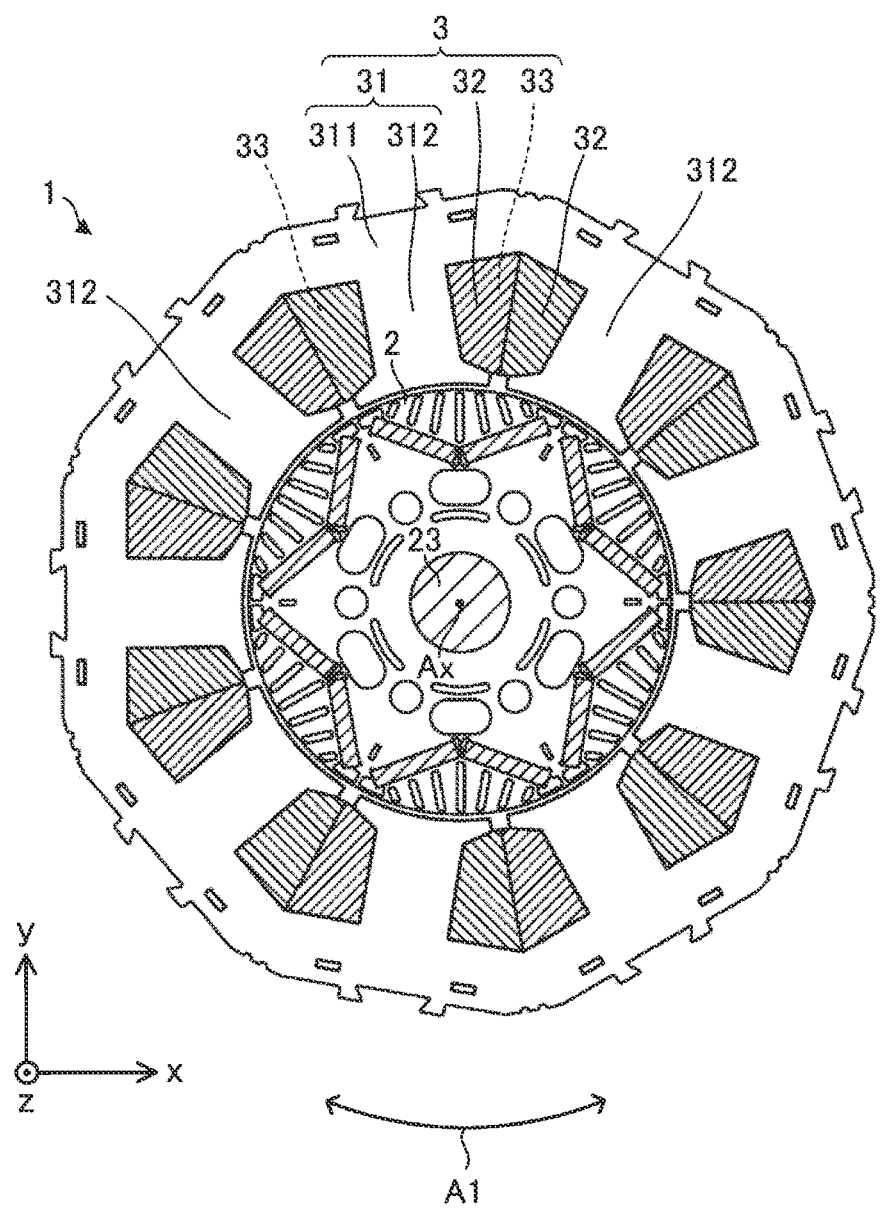
FIG. 1 is a cross-sectional view schematically illustrating a structure of an electric motor according to a first embodiment of the present invention.

In xyz orthogonal coordinate systems illustrated in the drawings, a z-axis direction (z axis) represents a direction parallel to an axis Ax of an electric motor 1, an x-axis direction (x axis) represents a direction orthogonal to the z-axis direction (z axis), and a y-axis direction (y axis) is a direction orthogonal to both the z-axis direction and the x-axis direction. The axis Ax is a rotation center of a rotor 2. The direction parallel to the axis Ax is also referred to as an "axial direction of the rotor 2" or simply an "axial direction." The radial direction refers to a radial direction of the rotor 2 or a stator 3, and is a direction orthogonal to the axis Ax. An xy plane is a plane perpendicular to the axial direction. An arrow A1 represents a circumferential direction about the axis Ax. A circumferential direction of the rotor 2 or the stator 3 will also be simply referred to as a "circumferential direction."

FIG. 1 is a cross-sectional view schematically illustrating a structure of the electric motor 1 according to a first embodiment of the present invention.

Figure 2:
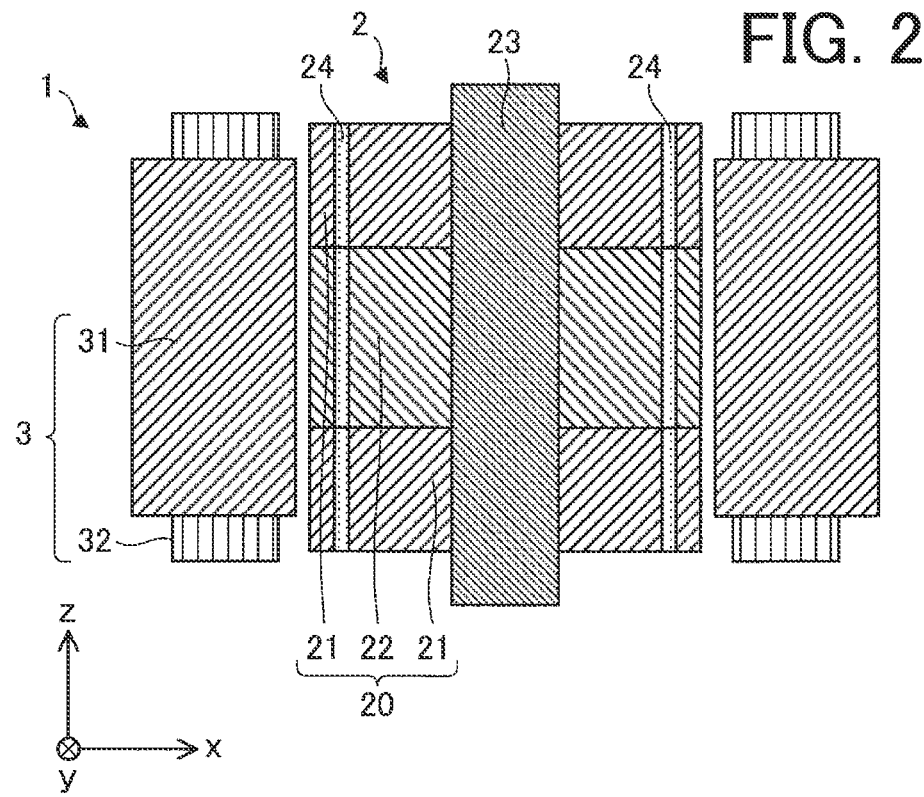
FIG. 2 is a cross-sectional view schematically illustrating a structure of the electric motor.

FIG. 2 is a cross-sectional view schematically illustrating a structure of the electric motor 1.

The electric motor 1 includes the rotor 2 having P (where P is an integer of 2 or more) and the stator 3 disposed outside the rotor 2. The electric motor 1 is, for example, a permanent magnet synchronous motor (also referred to as a brushless DC motor) such as an interior permanent magnet electric motor. The number P of magnetic poles is preferably an even number from 4 to 10, that is, 4, 6, 8, or 10.

The electric motor 1 is driven by, for example, inverter control. Accordingly, motor control in consideration of a cogging torque generated in the electric motor 1 can be performed. In particular, in a case where the electric motor 1 is a brushless DC motor driven by inverter control, variations of a torque ripple occurring during driving of the electric motor 1 can be suppressed, and thus vibrations and noise in the electric motor 1 can be reduced.

The rotor 2 is rotatably disposed inside the stator 3. The rotor 2 includes a first rotor core 21, a second rotor core 22, a shaft 23, and at least one permanent magnet 24. In this embodiment, the rotor 2 is a permanent magnet-embedded rotor.

The rotor 2 includes a rotor core part 20. In the example illustrated in FIG. 2, the rotor core part 20 includes two first rotor cores 21 and one second rotor core 22. The two first rotor cores 21 and the one second rotor core 22 are stacked in the axial direction. Specifically, the first rotor core 21, the second rotor core 22, and the first rotor core 21 are stacked in this order.

The rotor 2 includes a plurality of magnetic pole parts and a plurality of inter-pole parts. Each of the inter-pole parts is a boundary between two magnetic pole parts (i.e., a north pole and a south pole of the rotor 2) adjacent to each other in the circumferential direction. In other words, each of the magnetic pole parts is a region between two inter-pole parts. Each of the magnetic pole parts (also simply referred to as "each magnetic pole part" or a "magnetic pole part") of the rotor 2 is formed by at least one permanent magnet 24. That is, each magnetic pole part means a region serving as a north pole or a south pole of the rotor 2.

An air gap is present between the rotor 2 (specifically, an outer peripheral surface 22a of the second rotor core 22) and the stator 3. The air gap between the rotor 2 and the stator 3 is, for example, 0.3 mm to 1 mm. When an electric current having a frequency in synchronization with an instructed rotation speed is supplied to a winding 32 of the stator 3, a rotating magnetic field is generated in the stator 3, and the rotor 2 rotates.

The first rotor cores 21 and the second rotor core 22 are fixed to the shaft 23 by a fixing method such as shrink fitting or press fitting. When the rotor 2 rotates, rotation energy is transferred from the first rotor cores 21 and the second rotor core 22 to the shaft 23.

As illustrating FIG. 2, in the axial direction of the rotor 2, a portion of the first rotor cores 21 is located outside a stator core 31. Specifically, in the axial direction of the rotor 2, at least one first electrical steel sheet 211 described later is located outside the stator core 31.

The stator 3 includes the stator core 31, the at least one winding 32 attached to the stator core 31, at least one slot 33 in which the winding 32 is disposed. The stator core 31 includes an annular yoke 311 and a plurality of teeth 312. In the example illustrated in FIG. 1, the stator core 31 includes nine teeth 312 and nine slots 33. Each of the slots 33 is a space between adjacent teeth 312.

The number of the teeth 312 is not limited to nine. Similarly, the number of the slots 33 is not limited to nine.

The plurality of teeth 312 are radially arranged. In other words, the plurality of teeth 312 are arranged at regular intervals in the circumferential direction of the stator core 31. Each of the teeth 312 extends from the yoke 311 toward a rotation center of the rotor 2.

Each of the teeth 312 includes, for example, a body extending in the radial direction and a tooth front end located at the front end of the body and extending in the circumferential direction.

The plurality of teeth 312 and the plurality of slots 33 are alternately arranged at regular intervals in the circumferential direction of the stator core 31.

The stator core 31 is a ring-shaped iron core. The stator core 31 has a plurality of electrical steel sheets stacked in the axial direction. These electrical steel sheets are fixed together by swaging. Each of the plurality of electrical steel sheets is punched into a predetermined shape. Each of the plurality of electrical steel sheets has a thickness of, for example, 0.1 mm to 0.7 mm. In this embodiment, the thickness of each of the plurality of electrical steel sheets is 0.35 mm.

The winding 32 is wound around each of the teeth 312, whereby the winding 32 is disposed in each of the slots 33. For example, the winding 32 is wound around each of the teeth 312 by concentrated winding. An insulator is preferably disposed between the winding 32 and each of the teeth 312.

The stator winding 32 forms a coil for generating a rotation magnetic field. The coil is a three-phase coil, for example. In this case, the wiring type is, for example, Y connection. The winding 32 is, for example, a magnet wire having a diameter of 1 mm. When an electric current flows in the winding 32, a rotation magnetic field occurs. The number of turns and diameter of the winding 32 are set in accordance with, for example, a voltage applied to the winding 32, the rotation speed of the electric motor 1, and/or the cross-sectional area of the slot 33. The number of turns of the winding 32 is, for example, 80.

The structure of the rotor 2 will be described specifically.

<Structure of First Rotor Core 21>

Figure 3:
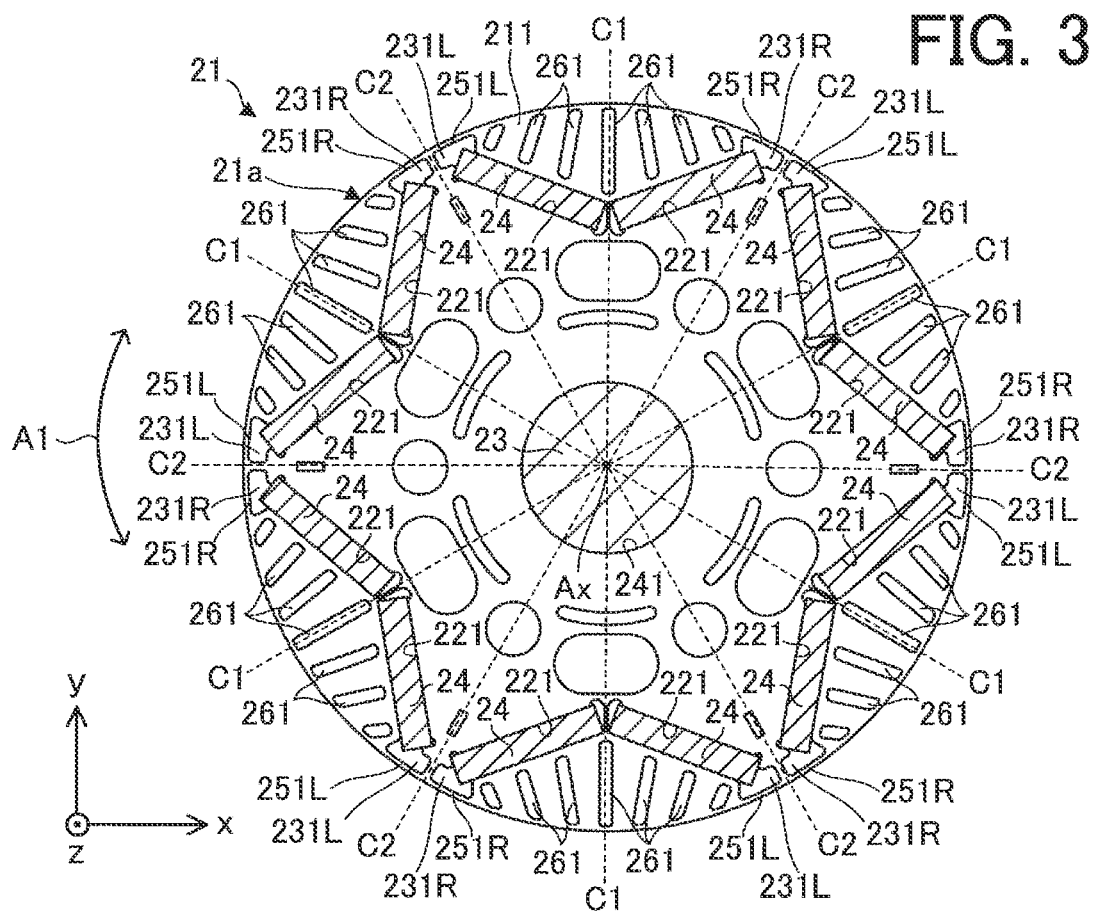
FIG. 3 is a plan view schematically illustrating a structure of a first rotor core.

FIG. 3 is a plan view schematically illustrating a structure of the first rotor core 21.

Figure 4:
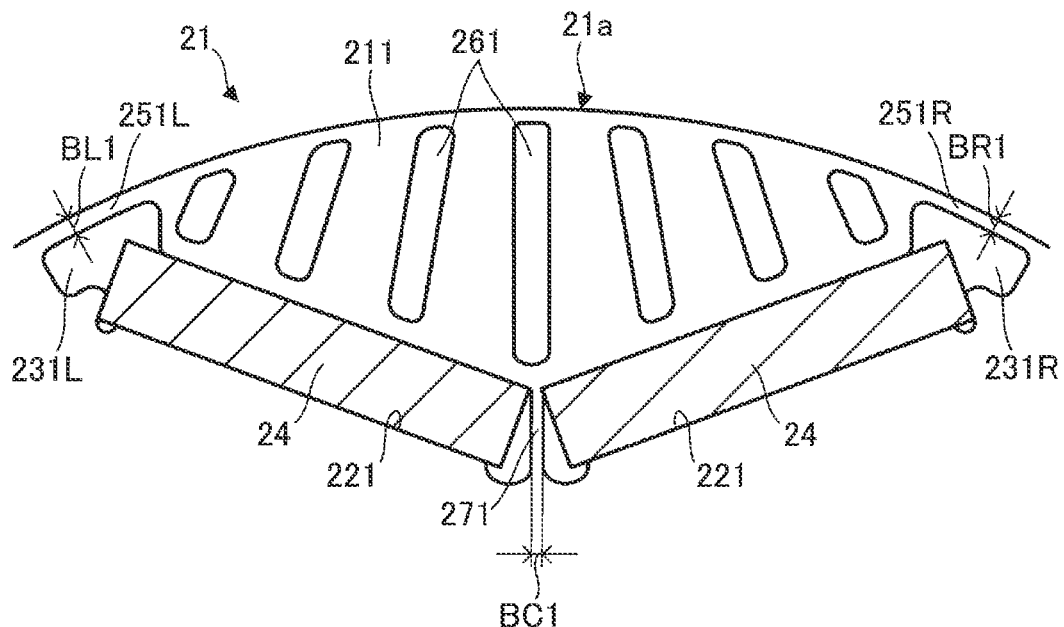
FIG. 4 is an enlarged view illustrating a structure of each magnetic pole part in the first rotor core illustrated in FIG. 3.

FIG. 4 is an enlarged view illustrating a structure of each magnetic pole part in the first rotor core 21 illustrated in FIG. 3.

In the example illustrated in FIG. 3, each magnetic pole center is represented by a magnetic pole center line C1, and each inter-pole part is represented by an inter-pole line C2. That is, each magnetic pole center line C1 passes through a magnetic pole center (i.e., the center of each magnetic pole part) of the rotor 2 (the first rotor core 21 in FIG. 3), and each inter-pole line C2 passes through an inter-pole part of the rotor 2 (the first rotor core 21 in FIG. 3).

The first rotor core 21 has at least one first electrical steel sheet 211. In this embodiment, the first rotor core 21 has a plurality of first electrical steel sheets 211 stacked in the axial direction. These first electrical steel sheets 211 are fixed together by swaging. Each of the plurality of first electrical steel sheets 211 is punched into a predetermined shape. Each of the plurality of first electrical steel sheets 211 has a thickness of, for example, 0.1 mm to 0.7 mm. In this embodiment, the thickness of each of the plurality of first electrical steel sheets 211 is 0.35 mm.

Each of the first electrical steel sheets 211 contains silicon.

Each of the first electrical steel sheets 211 includes a plurality of first magnet insertion holes 221, a plurality of first left flux barrier parts 231L, a plurality of first right flux barrier parts 231R, a first shaft hole 241, a plurality of first left bridges 251L (also referred to as first left thin portions), a plurality of first right bridges 251R (also referred to as first right thin portions), a plurality of first slits 261, and a plurality of first center bridges 271.

In the example illustrated in FIG. 3, each of the first electrical steel sheets 211 includes 12 first magnet insertion holes 221, six first left flux barrier parts 231L, six first right flux barrier parts 231R, one first shaft hole 241, six first left bridges 251L, six first right bridges 251R, 42 first slits 261, and six first center bridges 271.

The first magnet insertion holes 221, the first left flux barrier parts 231L, the first right flux barrier parts 231R, the first shaft hole 241, and the first slits 261 penetrate the first rotor core 21 (specifically the first electrical steel sheets 211) in the axial direction.

As illustrated in FIG. 4, each of the magnetic pole parts of each first electrical steel sheet 211 includes two first magnet insertion holes 221, one first left flux barrier part 231L, one first right flux barrier part 231R, one first left bridge 251L, one first right bridge 251R, and one first center bridge 271.

As illustrated in FIG. 4, in the xy plane, the first left flux barrier part 231L and the first right flux barrier part 231R are respectively provided on both sides of the magnetic pole part in the circumferential direction of the rotor 2. The first left flux barrier part 231L is a space communicating with the first magnet insertion hole 221. The first left flux barrier part 231L reduces magnetic flux leakage. The first right flux barrier part 231R is a space communicating with the other first magnet insertion hole 221. The first right flux barrier part 231R reduces magnetic flux leakage.

The magnetic flux leakage is leakage of magnetic flux from the permanent magnets 24 of each magnetic pole part of the rotor 2 to its adjacent magnetic pole part or leakage of magnetic flux from the permanent magnets 24 to the first center bridges 271.

The first left bridges 251L are portions of the first electrical steel sheets 211. The first left bridges 251L are disposed between the first left flux barrier parts 231L and the outer peripheral surface 21a of the first rotor core 21.

The first right bridges 251R are portions of the first electrical steel sheets 211. The first right bridges 251R are disposed between the first right flux barrier parts 231R and the outer peripheral surface 21a of the first rotor core 21.

The first center bridges 271 are portions of the first electrical steel sheets 211. Each of the first center bridges 271 is disposed between two permanent magnets 24. That is, each first center bridge 271 is disposed between two first magnet insertion holes 221. The first magnet insertion hole provided on the left of the first center bridge 271 will also be referred to as a "first left magnet insertion hole." The first magnet insertion hole provided on the right of the first center bridge 271 will also be referred to as a "first right magnet insertion hole." The first left magnet insertion hole and the first right magnet insertion hole will also be referred to as a pair of magnet placement parts. That is, in each magnetic pole part, the first electrical steel sheet 211 has the pair of magnet placement parts in which two permanent magnets 24 are placed. In this embodiment, in the xy plane, the pair of magnet placement parts has a V shape.

A width BL1 is a minimum width of each first left bridge 251L in the xy plane. A width BR1 is a minimum width of each first right bridge 251R in the xy plane. A width BC1 is a minimum width of each first center bridge 271 in the xy plane. A thickness tL1 is a thickness of each first left bridge 251L in the axial direction. A thickness tR1 is a thickness of each first right bridge 251R in the axial direction. A thickness tC1 is a thickness of each first center bridge 271 in the axial direction.

<Structure of Second Rotor Core 22>

Figure 5:
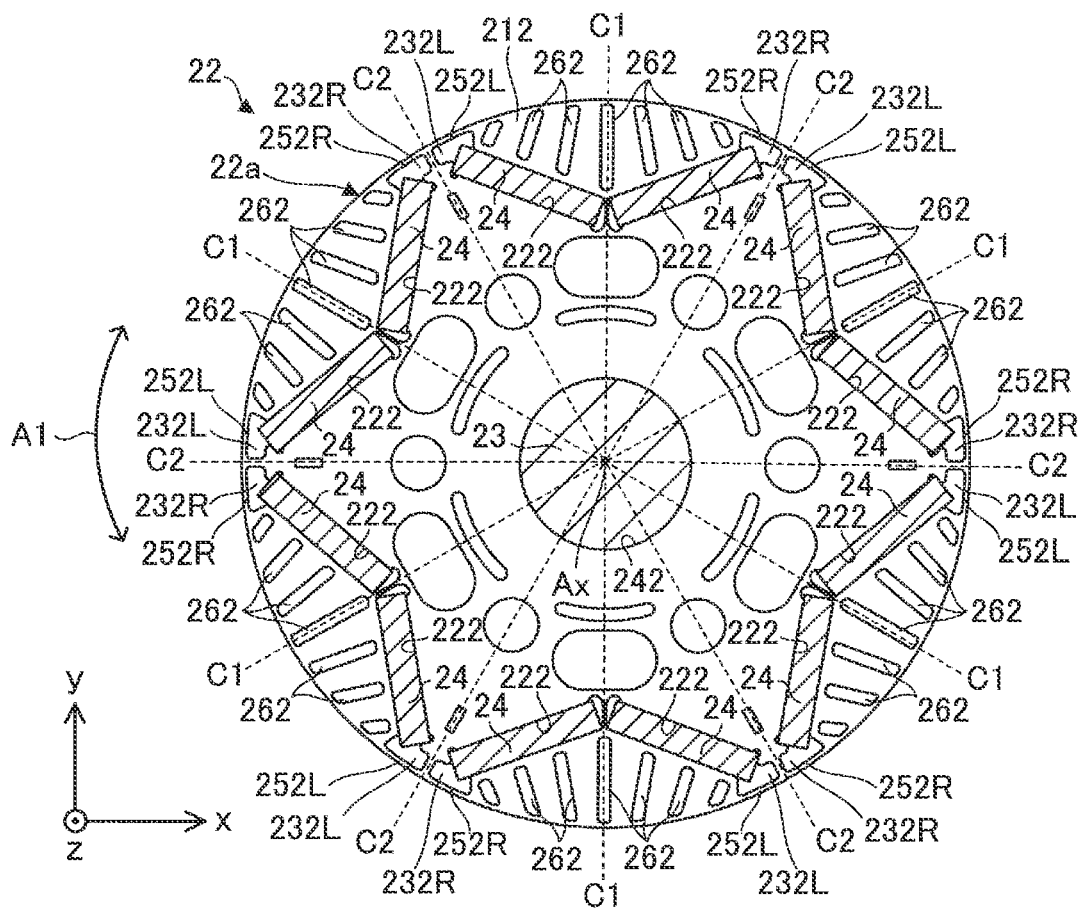
FIG. 5 is a plan view schematically illustrating a structure of a second rotor core.

FIG. 5 is a plan view schematically illustrating a structure of the second rotor core 22.

Figure 6:
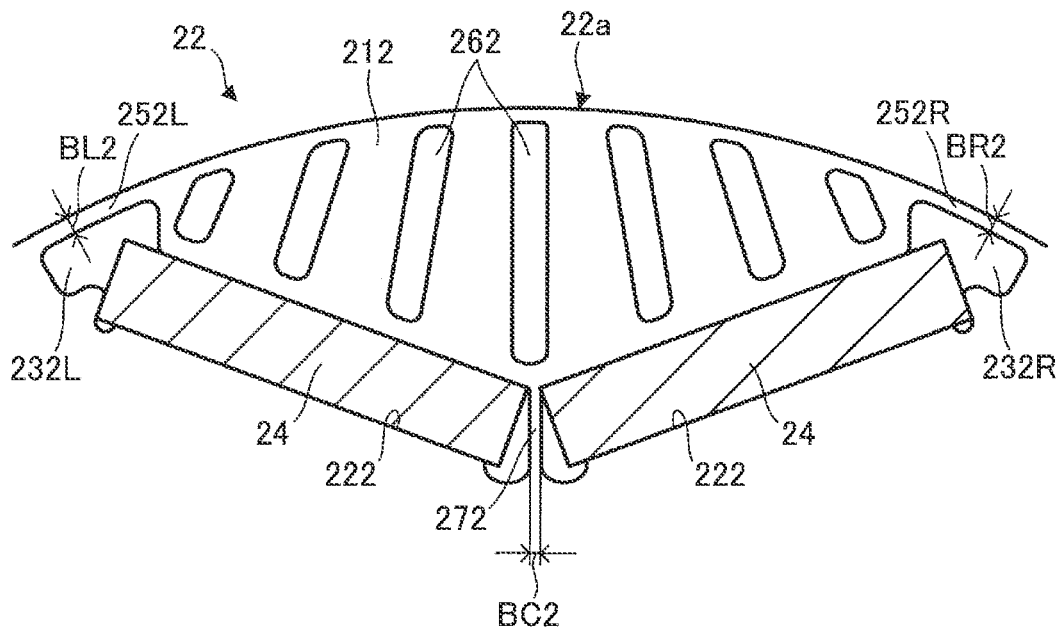
FIG. 6 is an enlarged view illustrating a structure of each magnetic pole part in the second rotor core illustrated in FIG. 5.

FIG. 6 is an enlarged view illustrating a structure of each magnetic pole part in the second rotor core 22 illustrated in FIG. 5.

In the example illustrated in FIG. 5, each magnetic pole center is represented by a magnetic pole center line C1, and each inter-pole part is represented by an inter-pole line C2. That is, each magnetic pole center line C1 passes through a magnetic pole center of the rotor 2 (the second rotor core 22 in FIG. 5), and each inter-pole line C2 passes through an inter-pole part of the rotor 2 (the second rotor core 22 in FIG. 5).

The second rotor core 22 has at least one second electrical steel sheet 212. In this embodiment, the second rotor core 22 has a plurality of second electrical steel sheets 212 stacked in the axial direction. These second electrical steel sheets 212 are fixed together by swaging. Each of the plurality of second electrical steel sheets 212 is punched into a predetermined shape. Each of the plurality of second electrical steel sheets 212 has a thickness of, for example, 0.1 mm to 0.7 mm. In this embodiment, the thickness of each of the plurality of second electrical steel sheets 212 is 0.35 mm.

Each of the second electrical steel sheets 212 contains silicon.

Each of the second electrical steel sheets 212 includes a plurality of second magnet insertion holes 222, a plurality of second left flux barrier parts 232L, a plurality of second right flux barrier parts 232R, a second shaft hole 242, a plurality of second left bridges 252L (also referred to as second left thin portions), a plurality of second right bridges 252R (also referred to as second right thin portions), a plurality of second slits 262, and a plurality of second center bridges 272.

In the example illustrated in FIG. 5, each of the second electrical steel sheets 212 includes 12 second magnet insertion holes 222, six second left flux barrier parts 232L, six second right flux barrier parts 232R, one second shaft hole 242, six second left bridges 252L, six second right bridges 252R, 42 second slits 262, and six second center bridges 272.

The second magnet insertion holes 222, the second left flux barrier parts 232L, the second right flux barrier parts 232R, the second shaft hole 242, and the second slits 262 penetrate the second rotor core 22 (specifically the second electrical steel sheets 212) in the axial direction.

As illustrated in FIG. 6, each of the magnetic pole parts of each second electrical steel sheet 212 includes two second magnet insertion holes 222, one second left flux barrier part 232L, one second right flux barrier part 232R, one second left bridge 252L, one second right bridge 252R, and one second center bridge 272.

As illustrated in FIG. 6, in the xy plane, the second left flux barrier part 232L and the second right flux barrier part 232R are respectively provided on both sides of the magnetic pole part in the circumferential direction of the rotor 2. The second left flux barrier part 232L is a space communicating with the second magnet insertion hole 222. The second left flux barrier part 232L reduces magnetic flux leakage. The second right flux barrier part 232R is a space communicating with the other second magnet insertion hole 222. The second right flux barrier part 232R reduces magnetic flux leakage.

The magnetic flux leakage is leakage of magnetic flux from the permanent magnets 24 of each magnetic pole part of the rotor 2 to its adjacent magnetic pole part or leakage of magnetic flux from the permanent magnets 24 to the second center bridges 272.

The second left bridges 252L are portions of the second electrical steel sheets 212. The second left bridges 252L are disposed between the second left flux barrier parts 232L and the outer peripheral surface 22a of the second rotor core 22.

The second right bridges 252R are portions of the second electrical steel sheets 212. The second right bridges 252R are disposed between the second right flux barrier parts 232R and the outer peripheral surface 22a of the second rotor core 22.

The second center bridges 272 are portions of the second electrical steel sheets 212. Each of the second center bridges 272 is disposed between two permanent magnets 24. That is, each second center bridge 272 is disposed between two second magnet insertion holes 222. The second magnet insertion hole provided on the left of the second center bridge 272 will also be referred to as a "second left magnet insertion hole." The second magnet insertion hole provided on the right of the second center bridge 272 will also be referred to as a "second right magnet insertion hole." That is, in each magnetic pole part, the second electrical steel sheet 212 has the pair of magnet placement parts in which two permanent magnets 24 are placed. In this embodiment, in the xy plane, the pair of magnet placement parts has a V shape.

A width BL2 is a minimum width of each second left bridge 252L in the xy plane. A width BR2 is a minimum width of each second right bridge 252R in the xy plane. A width BC2 is a minimum width of each second center bridge 272 in the xy plane. A thickness tL2 is a thickness of each second left bridge 252L in the axial direction. A thickness tR2 is a thickness of each second right bridge 252R in the axial direction. A thickness tC2 is a thickness of each second center bridge 272 in the axial direction.

The thickness of each first electrical steel sheet 211 may be equal to the thickness of each second electrical steel sheet 212. In this case, the electric motor 1 satisfies $tL1=tR1=tC1=tL2=tR2=tC2$.

In the xy plane, each second magnet insertion hole 222 overlaps with the first magnet insertion hole 221. In the xy plane, each second left flux barrier part 232L overlaps with the first left flux barrier part 231L. In the xy plane, each second right flux barrier part 232R overlaps with the first right flux barrier part 231R. In the xy plane, the second shaft hole 242 overlaps with the first shaft hole 241. In the xy plane, each second slit 262 overlaps with the first slit 261.

Each first magnet insertion hole 221 communicates with the second magnet insertion hole 222. Each first left flux barrier part 231L communicates with the second left flux barrier part 232L. Each first right flux barrier part 231R communicates with the second right flux barrier part 232R. Each first shaft hole 241 communicates with the second shaft hole 242. Each first slit 261 communicates with the second slit 262.

Thus, one permanent magnet 24 is placed in the first magnet insertion hole 221 and the second magnet insertion hole 222 communicating with each other. In this embodiment, the rotor 2 includes 12 permanent magnets 24.

A pair of permanent magnets 24 (specifically, two permanent magnets 24) disposed in each magnetic pole part serves as one magnetic pole of the rotor 2. That is, in each magnetic pole part of the rotor 2, a pair of permanent magnets 24 (specifically, two permanent magnets 24) functions as a north pole or a south pole to the stator 3.

In this embodiment, the number of magnetic poles of the rotor 2 is six.

The shaft 23 is fixed to the first shaft hole 241 and the second shaft hole 242 by shrink fitting, press fitting, or the like.

Each permanent magnet 24 is a flat-plate magnet elongated in the axial direction. Each permanent magnet 24 is magnetized in the direction orthogonal to the longitudinal direction of the permanent magnet 24 in the xy plane. That is, in the xy plane, each permanent magnet 24 is magnetized in the lateral direction of the permanent magnet 24. Each permanent magnet 24 is a rare earth magnet containing neodymium (Nd), iron (Fe), and boron (B), for example.

A coercive force of the Nd—Fe—B permanent magnet has a property of decreasing depending on temperature. For example, in the case of using an electric motor including Nd rare earth magnets in a high-temperature atmosphere at 100° C. or more, such as in the case of a compressor, the coercive force of the magnets degrades by about −0.5%/ΔK to −0.6%/ΔK depending on the temperature, and thus, the coercive force needs to be increased by adding dysprosium (Dy). The coercive force increases substantially in proportion to the content of Dy. In a general compressor, the upper limit of the ambient temperature of an electric motor is about 150° C., and the electric motor is used within a range of temperature rise of about 130° C. with respect to 20° C. For example, the coercive force decreases by 65% with a temperature coefficient of −0.5%/ΔK.

To prevent demagnetization under a maximum load of a compressor, a coercive force of about 1100 A/m to about 1500 A/m is necessary. To obtain a coercive force at an ambient temperature of 150° C., a coercive force at room temperature needs to be designed to be about 1800 A/m to about 2300 A/m.

In a state where Dy is not added to the Nd—Fe—B permanent magnet, the coercive force at room temperature is about 1800 A/m. To obtain a coercive force of about 2300 kA/m, about 2 wt % of Dy needs to be added. However, the addition of Dy enhances a coercive force property, but degrades a residual flux density property. When the residual flux density decreases, a magnet torque of an electric motor decreases and a supply current increases, and thus, a copper loss increases. Thus, in consideration of efficiency of the electric motor, reduction of the amount of Dy addition is desired.

In the first rotor cores 21, influence of magnetic flux leakage on efficiency of the electric motor 1 is smaller than that in the second rotor core 22. On the other hand, in the second rotor core 22, influence of magnetic flux leakage on efficiency of the electric motor 1 is larger than that in the first rotor cores 21. For example, in the second rotor core 22, when magnetic flux leakage increases, efficiency of the electric motor 1 decreases. Thus, in the second rotor core 22, the width BL2 of each second left bridge 252L in the xy plane and the width BR2 of each second right bridge 252R in the xy plane are preferably small. Similarly, the thickness tL2 of each second left bridge 252L in the axial direction and the thickness tR2 of each second right bridge 252R in the axial direction are preferably small.

For example, the sum of a minimum cross-sectional area BL2×tL2 in each second left bridge 252L and a minimum cross-sectional area BR2×tR2 in each second right bridge 252R are preferably small.

However, as the width BL2 of each second left bridge 252L and the width of each second right bridge 252R decrease, mechanical strength of the second rotor core 22 decreases. Similarly, as the thickness tL2 of each second left bridge 252L and the thickness tR2 of each second right bridge 252R decrease, mechanical strength of the second rotor core 22 decreases. Thus, to maintain mechanical strength of the rotor 2, mechanical strength of the first rotor core 21 is preferably maintained.

In this embodiment, the electric motor 1 satisfies (BL1×tL1+BR1×tR1)>(BL2×tL2+BR2×tR2). Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

The electric motor 1 preferably satisfies (BL1×tL1+BR1×tR1+BC1×tC1)>(BL2×tL2+BR2×tR2+BC2×tC2). Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be further enhanced.

If the electric motor 1 satisfies (BL1×tL1+BR1×tR1)>(BL2×tL2+BR2×tR2), the electric motor 1 satisfies, for example, BL1>BL2, BR1>BR2, and BC1>BC2, or BL1>BL2 and BR1>BR2. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

The thickness of each first electrical steel sheet 211 may be different from the thickness of each second electrical steel sheet 212. In this case, the electric motor 1 satisfies, for example, tL1>tL2, tR1>tR2, and tC1>tC2, or tL1>tL2 and tR1>tR2. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

If the electric motor 1 satisfies tL1>tL2, tR1>tR2, and tC1>tC2, the electric motor 1 satisfies, for example, BL1=BL2=BR1=BR2=BC1=BC2. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

The electric motor 1 may satisfy, for example, BL1>BL2, BR1>BR2, BC1>BC2, tL1>tL2, tR1>tR2, and tC1>tC2. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

If the electric motor 1 satisfies (BL1×tL1+BR1×tR1)>(BL2×tL2+BR2×tR2), the electric motor 1 may satisfy BL1 tL1, BR1 tR1, BL2 tL2, and BR2 tR2, or BL1 tL1, BR1 tR1, BL2 tL2, BR2 tR2, BC1 tC1, and BC2 tC2. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. As a result, efficiency of the electric motor 1 can be enhanced. In this case, each first electrical steel sheet 211 and each second electrical steel sheet 212 can be easily processed.

If the electric motor 1 satisfies (BL1×tL1+BR1×tR1+BC1×tC1)>(BL2×tL2+BR2×tR2+BC2×tC2), the electric motor 1 may satisfy BL1 tL1, BR1 tR1, BL2 tL2, BR2 tR2, BC1 tC1, and BC2 tC2. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. As a result, efficiency of the electric motor 1 can be further enhanced. In this case, each first electrical steel sheet 211 and each second electrical steel sheet 212 can be easily processed.

Supposing a content of silicon in each first electrical steel sheet 211 is Si1 [weight %], and a content of silicon in each second electrical steel sheet 212 is Si2 [weight %], the electric motor 1 satisfies Si1>Si2. In this case, Si1=5 weight %, and Si2=3.5 weight %. Accordingly, mechanical strength of the first rotor cores 21 can be enhanced to be higher than mechanical strength of the second rotor core 22. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Each permanent magnet 24 is a rare earth magnet containing neodymium (Nd), iron (Fe), and boron (B), for example. In this case, each of the permanent magnets 24 does not necessarily need to contain Dy. Even if the permanent magnets 24 do not contain Dy, magnetic flux leakage in the rotor 2 can be reduced, and thus, efficiency of the electric motor 1 can be enhanced.

Variations of the electric motor 1 according to the first embodiment will be described below. In the variations, aspects different from those in the first embodiment will be described.

First Variation

Figure 7:
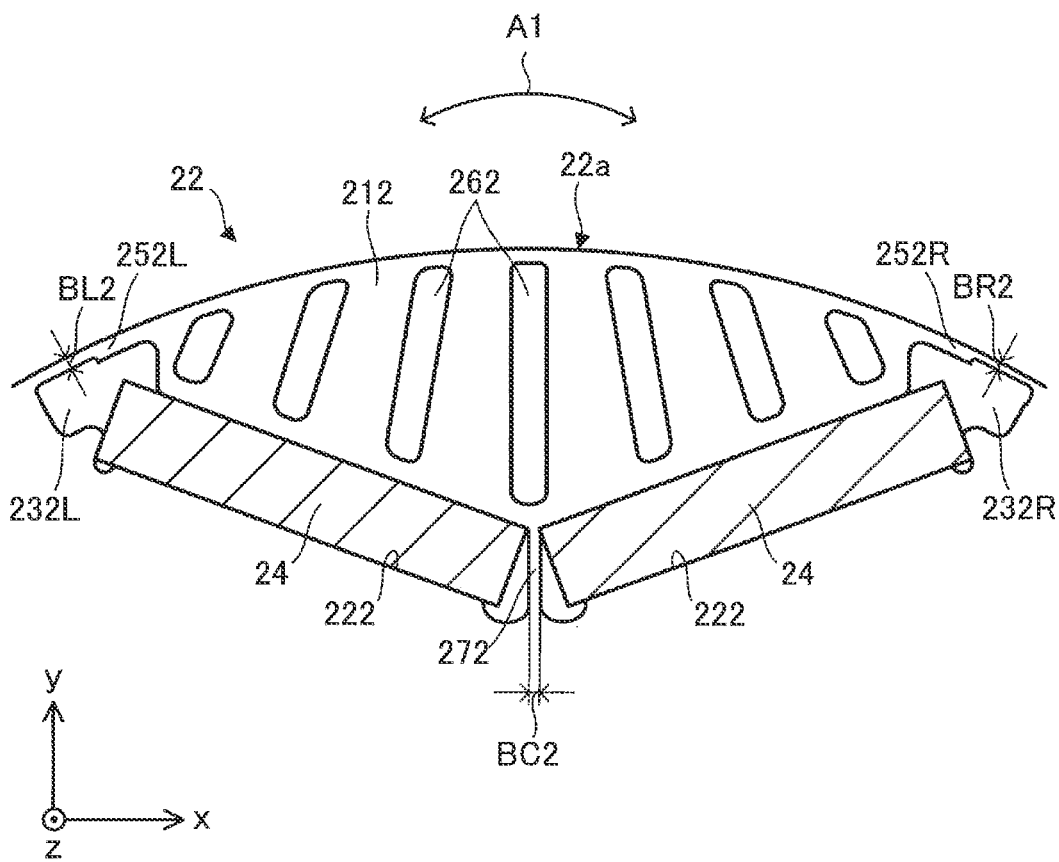
FIG. 7 is a plan view schematically illustrating another example of the second rotor core.

FIG. 7 is a plan view schematically illustrating another example of the second rotor core 22. Specifically, FIG. 7 is an enlarged view illustrating a structure of each magnetic pole part in the second rotor core 22.

In the first variation, the width BL2 of each second left bridge 252L of the second rotor core 22 is smaller than the width BL1 of each first left bridge 251L of the first rotor cores 21, the width BR2 of each second right bridge 252R of the second rotor core 22 is smaller than the width BR1 of each first right bridge 251R of the first rotor cores 21, and the width BC2 of each second center bridge 272 of the second rotor core 22 is smaller than the width BC1 of each first center bridges 271 of the first rotor cores 21.

For example, in the first variation, the width BL1 of each first left bridge 251L of the first rotor cores 21, the width BR1 of each first right bridge 251R of the first rotor cores 21, and the width BC1 of each first center bridge 271 of the first rotor cores 21 are 0.365 mm, the width BL2 of each second left bridge 252L, the width BR2 of each second right bridge 252R of the second rotor core 22, and the width BC2 of each second center bridge 272 of the second rotor core 22 are 0.2 mm.

In the first variation, the thickness of each first electrical steel sheet 211 of the first rotor cores 21 is equal to the thickness of each second electrical steel sheet 212 of the second rotor core 22. The thickness of each first electrical steel sheet 211 and the thickness of each second electrical steel sheet 212 are, for example, 0.365 mm.

That is, in the first variation, the electric motor 1 satisfies BL1>BL2, BR1>BR2, BC1>BC2, and tL1=tR1=tC1=tL2=tR2=tC2.

In the first variation, the width BL2 of each second left bridge 252L is smaller than the width BL1 of each first left bridge 251L, the width BR2 of each second right bridge 252R is smaller than the width BR1 of each first right bridge 251R, and the width BC2 of each second center bridge 272 is smaller than the width BC1 of each first center bridge 271. Thus, leakage of magnetic flux passing through the second left bridges 252L, the second right bridges 252R, and the second center bridges 272 can be reduced. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Second Variation

In a second variation, the thickness tL2 of each second left bridge 252L is smaller than the thickness tL1 of each first left bridge 251L, the thickness tR2 of each second right bridge 252R is smaller than the thickness tR1 of each first right bridge 251R, and the thickness tC2 of each second center bridge 272 is smaller than the thickness tC1 of each first center bridge 271. That is, the electric motor 1 satisfies tL1>tL2, tR1>tR2, and tC1>tC2. The thickness of each second electrical steel sheet 212 may be smaller than the thickness of each first electrical steel sheet 211.

In the second variation, for example, the width BL2 of each second left bridge 252L is equal to the width BL1 of each first left bridge 251L, the width BR2 of each second right bridge 252R is equal to the width BR1 of each first right bridge 251R, and the width BC2 of each second center bridge 272 is equal to the width BC1 of each first center bridge 271. The width BL2 of each second left bridge 252L may be different from the width BL1 of each first left bridge 251L, the width BR2 of each second right bridge 252R may be different from the width BR1 of each first right bridge 251R, and the width BC2 of each second center bridge 272 may be different from the width BC1 of each first center bridge 271.

For example, in the second variation, the width BL2 of each second left bridge 252L, the width BL1 of each first left bridges 251L, the width BR2 of each second right bridge 252R, the width BR1 of each first right bridges 251R, the width BC2 of each second center bridge 272, the width BC1 of each first center bridges 271, the thickness tL1 of each first left bridge 251L, the thickness tR1 of each first right bridge 251R, and the thickness tC1 of each first center bridge 271 are 0.365 mm, and the thickness tL2 of each second left bridge 252L, the thickness tR2 of each second right bridge 252R, and the thickness tC2 of each second center bridge 272 are 0.2 mm.

That is, in the second variation, the electric motor 1 satisfies BL1=BL2=BR1=BR2=BC1=BC2, tL1>tL2, tR1>tR2, and tC1>tC2.

In the second variation, the thickness tL2 of each second left bridge 252L is smaller than the thickness tL1 of each first left bridge 251L, the thickness tR2 of each second right bridge 252R is smaller than the thickness tR1 of each first right bridge 251R, and the thickness tC2 of each second center bridge 272 is smaller than the thickness tC1 of each first center bridge 271. Thus, leakage of magnetic flux passing through the second left bridges 252L, the second right bridges 252R, and the second center bridges 272 can be reduced. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Third Variation

In a third variation, the thickness tL2 of each second left bridge 252L is smaller than the thickness tL1 of each first left bridge 251L, the thickness tR2 of each second right bridge 252R is smaller than the thickness tR1 of each first right bridge 251R, and the thickness tC2 of each second center bridge 272 is smaller than the thickness tC1 of each first center bridge 271.

Specifically, in the third variation, the width BL2 of each second left bridge 252L of the second rotor core 22 is smaller than the width BL1 of each first left bridges 251L of the first rotor cores 21, the width BR2 of each second right bridge 252R of the second rotor core 22 is smaller than the width BR1 of each first right bridge 251R of the first rotor cores 21, the width BC2 of each second center bridge 272 of the second rotor core 22 is smaller than the width BC1 of each first center bridges 271 of the first rotor cores 21, the thickness tL2 of each second left bridge 252L is smaller than the thickness tL1 of each first left bridge 251L, the thickness tR2 of each second right bridge 252R is smaller than the thickness tR1 of each first right bridge 251R, and the thickness tC2 of each second center bridge 272 is smaller than the thickness tC1 of each first center bridge 271. In other words, the electric motor 1 satisfies BL1>BL2, BR1>BR2, BC1>BC2, tL1>tL2, tR1>tR2, and tC1>tC2.

For example, in the third variation, the width BL1 of each first left bridge 251L, the width BR1 of each first right bridge 251R, the width BC1 of each first center bridge 271, the thickness tL1 of each first left bridge 251L, the thickness tR1 of each first right bridge 251R, and the thickness tC1 of each first center bridge 271 are 0.365 mm, and the width BL2 of each second left bridge 252L, the width BR2 of each second right bridge 252R, the width BC2 of each second center bridge 272, the thickness tL2 of each second left bridge 252L, the thickness tR2 of each second right bridge 252R, and the thickness tC2 of each second center bridge 272 are 0.2 mm.

In the third variation, since the electric motor 1 satisfies BL1>BL2, BR1>BR2, BC1>BC2, tL1>tL2, tR1>tR2, and tC1>tC2, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Fourth Variation

Figure 8:
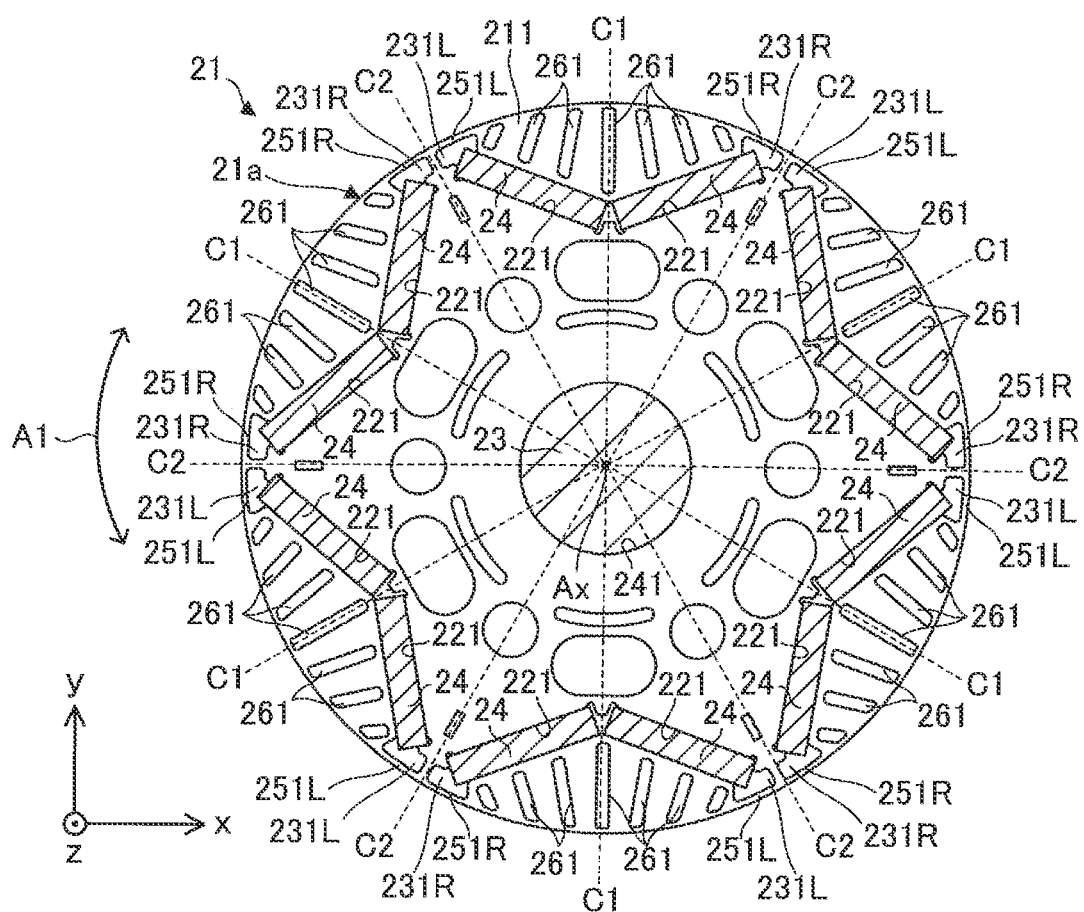
FIG. 8 is a plan view schematically illustrating another example of the first rotor core.

FIG. 8 is a plan view schematically illustrating another example of the first rotor core 21.

Figure 9:
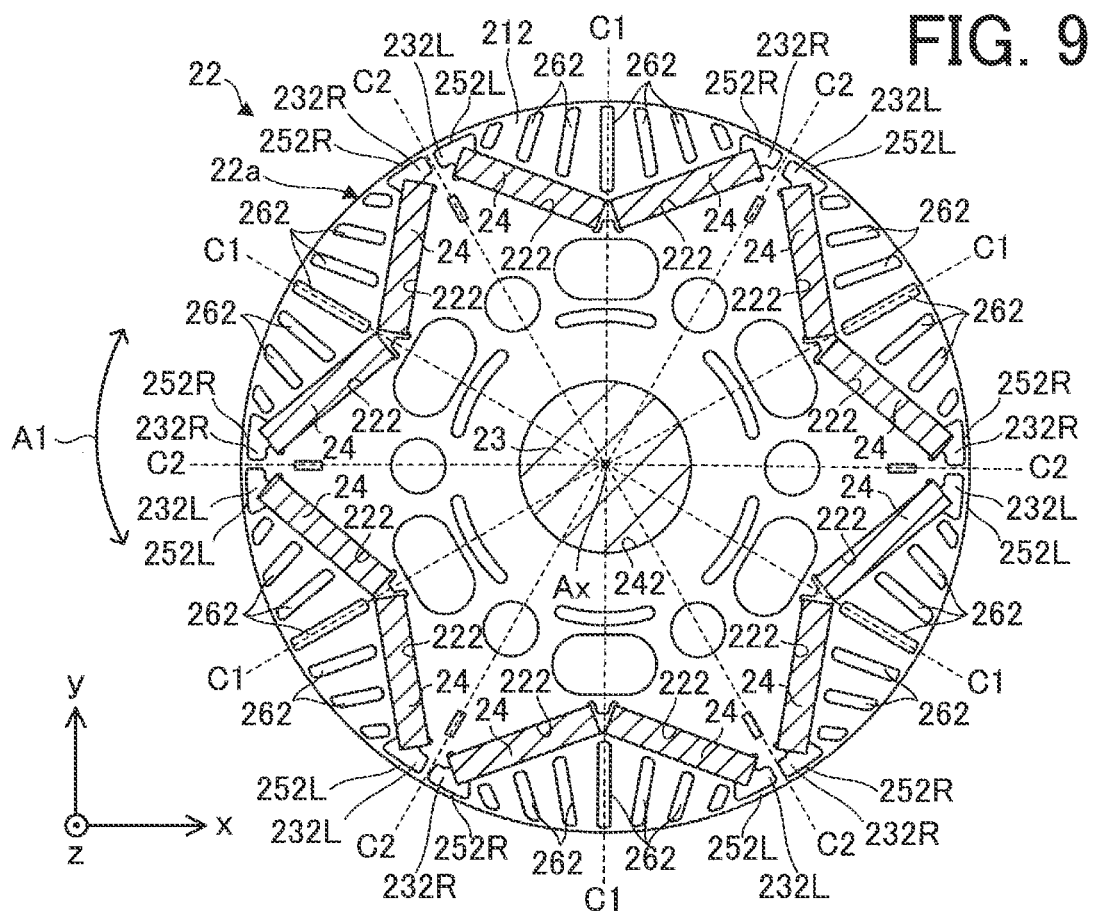
FIG. 9 is a plan view schematically illustrating yet another example of the second rotor core.

FIG. 9 is a plan view schematically illustrating still another example of the second rotor core 22.

In a fourth variation, the first rotor core 21 includes no first center bridges 271. That is, in the first rotor core 21, each magnetic pole part has one magnet placement part in which two permanent magnets 24 are placed. Each magnet placement part includes two first magnet insertion holes 221 communicating with each other. The first rotor core 21 in the fourth variation is the same as the first rotor core 21 described in the first embodiment except for the first center bridges 271.

Similarly, in the fourth variation, the second rotor core 22 includes no second center bridges 272. That is, in the second rotor core 22, each magnetic pole part includes one magnet placement part in which two permanent magnets 24 are placed. Each magnet placement part includes two second magnet insertion holes 222 communicating with each other. The second rotor core 22 in the fourth variation is the same as the second rotor core 22 described in the first embodiment except for the second center bridges 272.

The fourth variation also has the advantages described in the first embodiment. For example, the electric motor 1 satisfies (BL1×tL1+BR1×tR1)>(BL2×tL2+BR2×tR2). Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Fifth Variation

Figure 10:
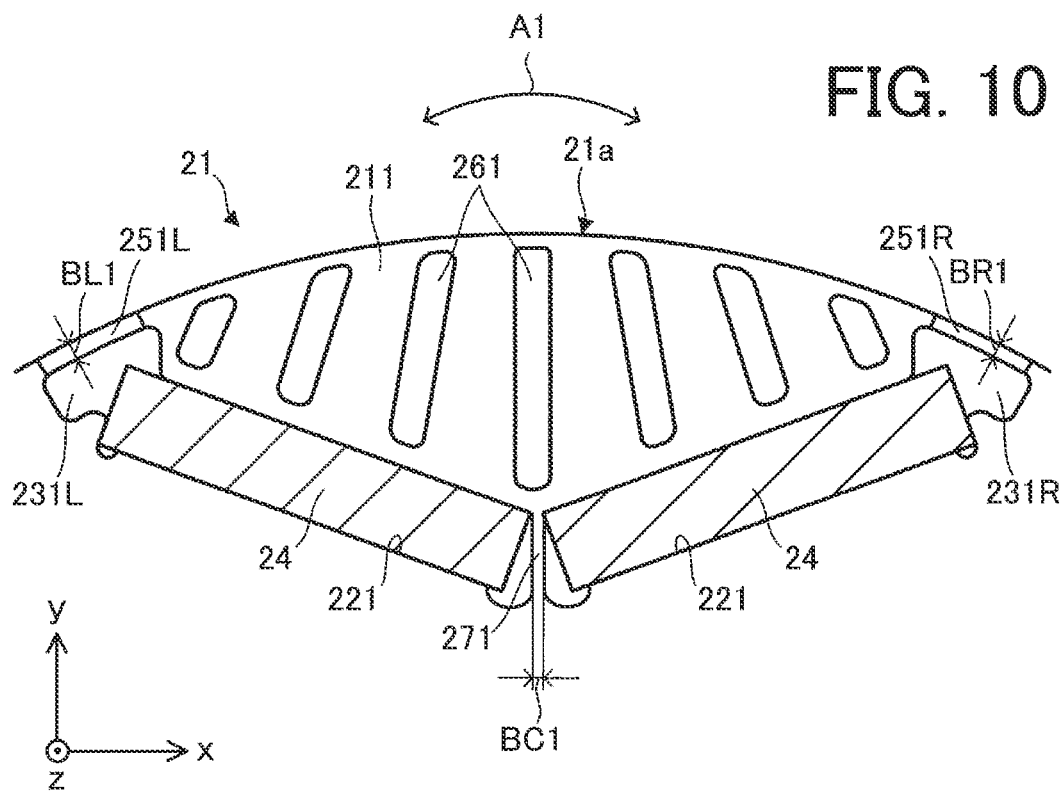
FIG. 10 is a plan view schematically illustrating yet another example of the first rotor core.

FIG. 10 is a plan view schematically illustrating still another example of the first rotor core 21.

Figure 11:
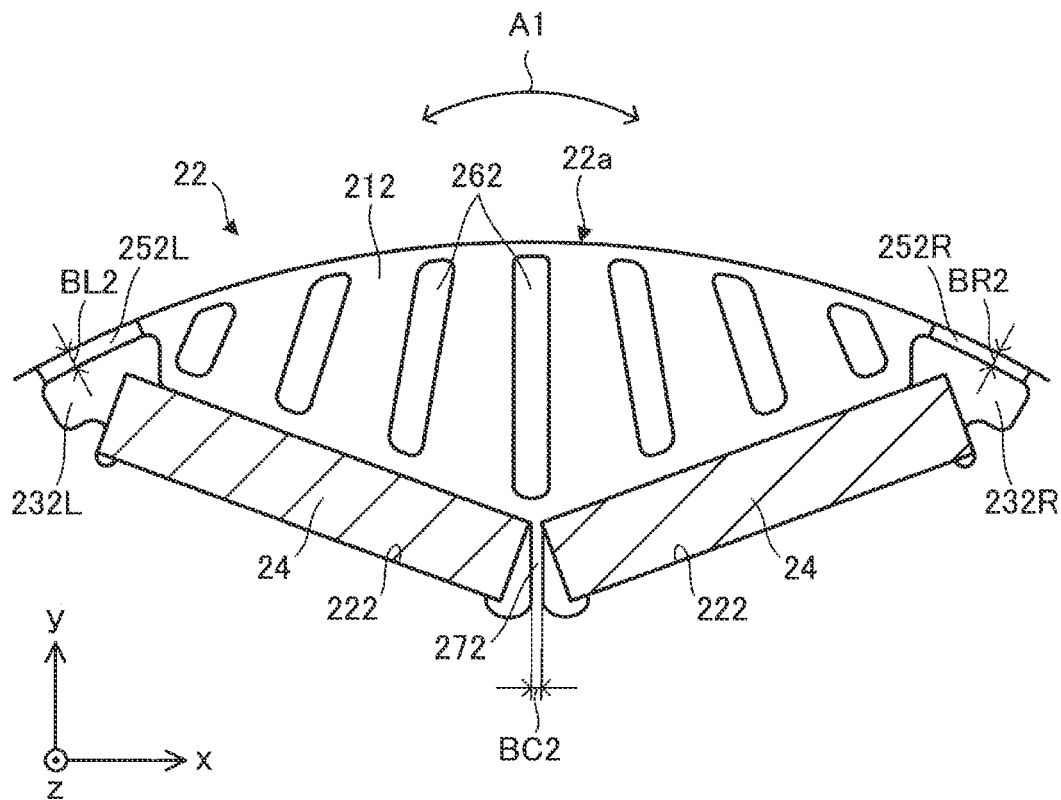
FIG. 11 is a plan view schematically illustrating still another example of the second rotor core.

FIG. 11 is a plan view schematically illustrating still another example of the second rotor core 22.

In a fifth variation, the first left bridges 251L are different from the first left bridges 251L described in the first embodiment, and the first right bridges 251R are different from the first right bridges 251R described in the first embodiment. Specifically, although the first left bridges 251L are portions of the first electrical steel sheets 211 in the first embodiment, the first left bridges 251L are non-magnetic materials in the fifth variation. Similarly, although the first right bridges 251R are portions of the first electrical steel sheets 211 in the first embodiment, the first right bridges 251R are non-magnetic materials in the fifth variation.

The first rotor core 21 in the fifth variation is the same as the first rotor core 21 described in the first embodiment except for the first left bridges 251L and the first right bridges 251R. Each of the first electrical steel sheets 211 does not necessarily need to include the first center bridges 271.

Similarly, in the fifth variation, the second left bridges 252L are different from the second left bridges 252L described in the first embodiment, and the second right bridges 252R are different from the second right bridges 252R described in the first embodiment. Specifically, although the second left bridges 252L are portions of the second electrical steel sheets 212 in the first embodiment, the second left bridges 252L are non-magnetic materials in the fifth variation. Similarly, although the second right bridges 252R are portions of the second electrical steel sheets 212 in the first embodiment, the second right bridges 252R are non-magnetic materials in the fifth variation.

The second rotor core 22 in the fifth variation is the same as the second rotor core 22 described in the first embodiment except for the second left bridges 252L and the second right bridges 252R. Each of the second electrical steel sheets 212 does not necessarily need to include the second center bridges 272.

In the fifth variation, the non-magnetic material is, for example, a thermosetting resin such as an epoxy resin. The non-magnetic material may be glass or ceramic. The non-magnetic material is fixed to the first electrical steel sheets 211 and the second electrical steel sheets 212 with, for example, an adhesive.

In the fifth variation, a proportion of the non-magnetic material in a cross-sectional area of each second electrical steel sheet 212 in the xy plane is larger than a proportion of the non-magnetic material in a cross-sectional area of each first electrical steel sheet 211 in the xy plane. The proportion of the non-magnetic material in the cross-sectional area of each second electrical steel sheet 212 in the xy plane is, for example, 2%, and the proportion of the non-magnetic material in the cross-sectional area of each first electrical steel sheet 211 in the xy plane is, for example, 1%.

Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Sixth Variation

Figure 12:
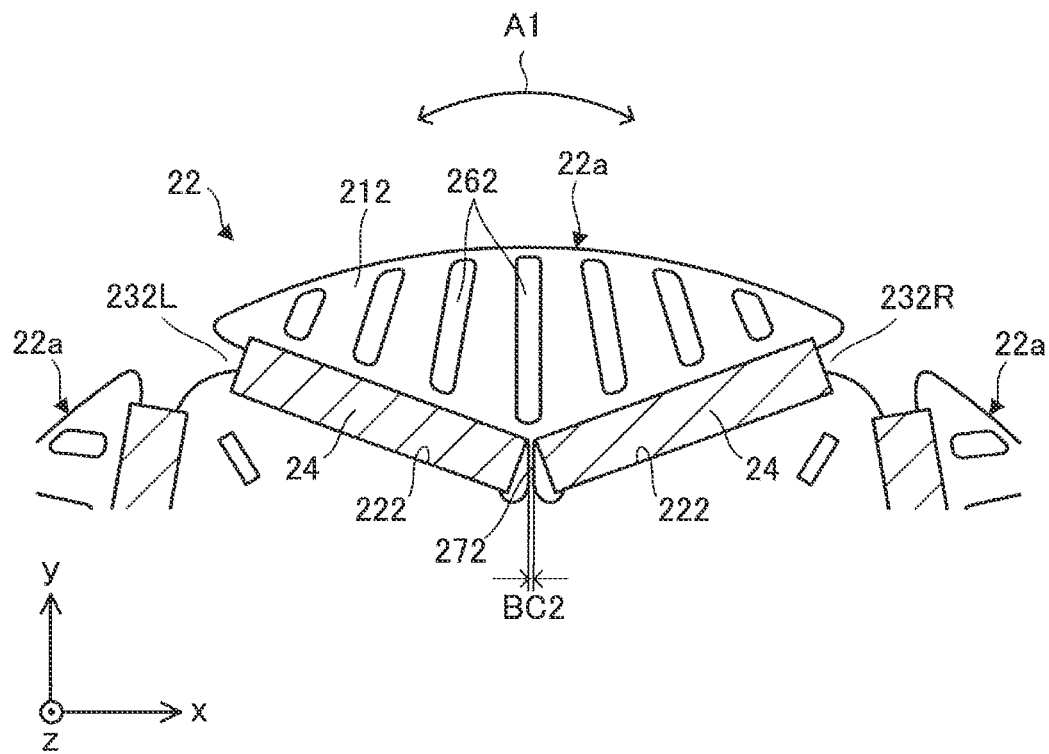
FIG. 12 is a plan view schematically illustrating still another example of the second rotor core.

FIG. 12 is a plan view schematically illustrating still another example of the second rotor core 22. Specifically, FIG. 12 is an enlarged view illustrating a structure of each magnetic pole part in the second rotor core 22.

In a sixth variation, the second rotor core 22 includes none of the second left bridges 252L and the second right bridges 252R. Thus, the second rotor core 22 includes an air gap provided in each inter-pole part of the second rotor core 22, and the plurality of outer peripheral surfaces 22a separated from one another. In the sixth variation, the outer peripheral surfaces 22a will also be referred to as outer peripheral parts. The second rotor core 22 in the sixth variation is the same as the second rotor core 22 described in the first embodiment except for the second left bridges 252L and the second right bridges 252R.

In the sixth variation, since the second rotor core 22 includes none of the second left bridges 252L and the second right bridges 252R, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Seventh Variation

Figure 13:
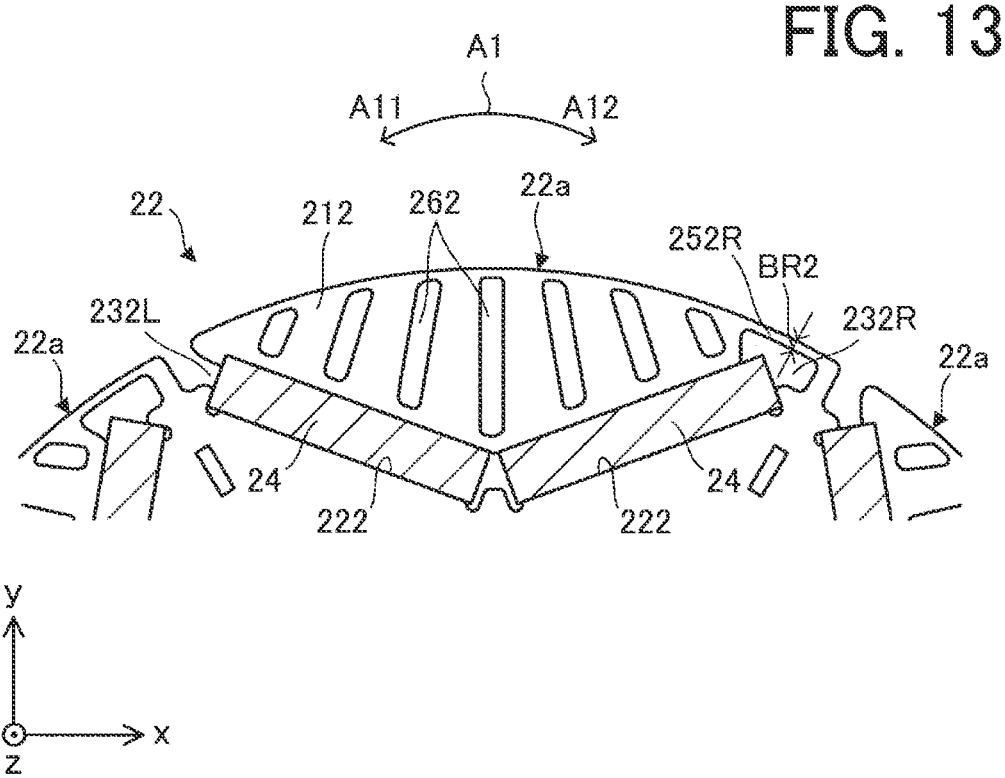
FIG. 13 is a plan view schematically illustrating still another example of the second rotor core.

FIG. 13 is a plan view schematically illustrating still another example of the second rotor core 22. Specifically, FIG. 13 is an enlarged view illustrating a structure of each magnetic pole part in the second rotor core 22. In FIG. 13, arrow A1 represents rotation directions of the rotor 2. Thus, arrow A11 indicates a downstream side in the rotation direction of the rotor 2, and arrow A12 indicates an upstream side in the rotation direction of the rotor 2.

The second right flux barrier part 232R is disposed on the upstream side in the rotation direction of the rotor 2.

In the seventh variation, in each magnetic pole part of the second rotor core 22, a bridge is provided on the upstream side in the rotation direction of the rotor 2, and no bridge is provided on the downstream side in the rotation direction of the rotor 2. That is, in the seventh variation, a bridge (i.e., the second right bridge 252R) is provided between the second right flux barrier part 232R and the outer edge of the second rotor core 22. In the example illustrated in FIG. 13, the second rotor core 22 includes none of the second left bridges 252L and the second center bridges 272, and includes the second right bridges 252R. In the seventh variation, the second rotor core 22 may include the second center bridges 272.

In the seventh variation, in the second rotor core 22, an air gap is provided in the inter-pole part on the downstream side in the rotation direction of the rotor 2. Accordingly, the second rotor core 22 includes the air gap provided on the downstream side in the rotation direction of the rotor 2, and the plurality of outer peripheral surfaces 22a separated from one another. In the seventh variation, the outer peripheral surfaces 22a will also be referred to as outer peripheral parts. The second rotor core 22 in the seventh variation is the same as the second rotor core 22 described in the first embodiment except for the second left bridges 252L and the second center bridges 272.

In general, in an electric motor, magnetic flux leakage tends to increase in inter-pole parts on the downstream side in the rotation direction of a rotor. On the other hand, in the seventh variation, since no bridges are provided on the downstream side in the rotation direction of the rotor 2, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Eighth Variation

Figure 14:
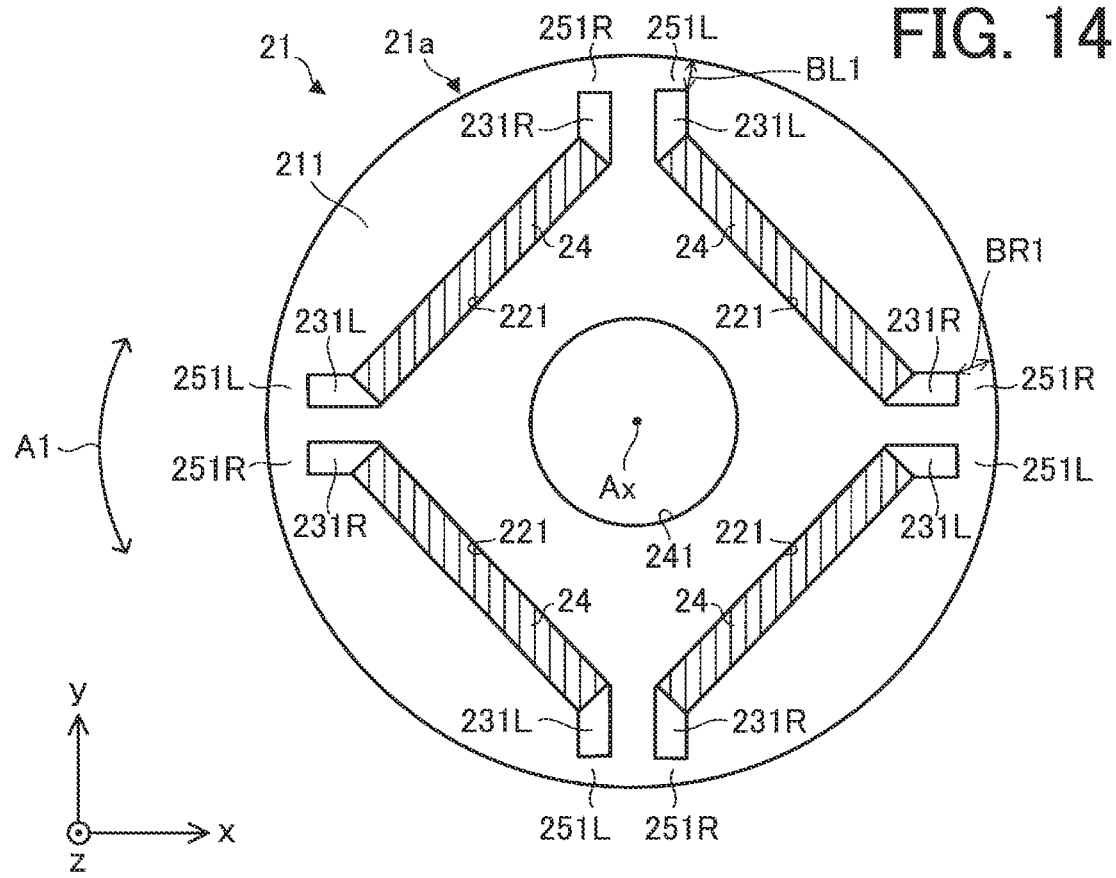
FIG. 14 is a plan view schematically illustrating still another example of the first rotor core.

FIG. 14 is a plan view schematically illustrating still another example of the first rotor core 21.

Figure 15:
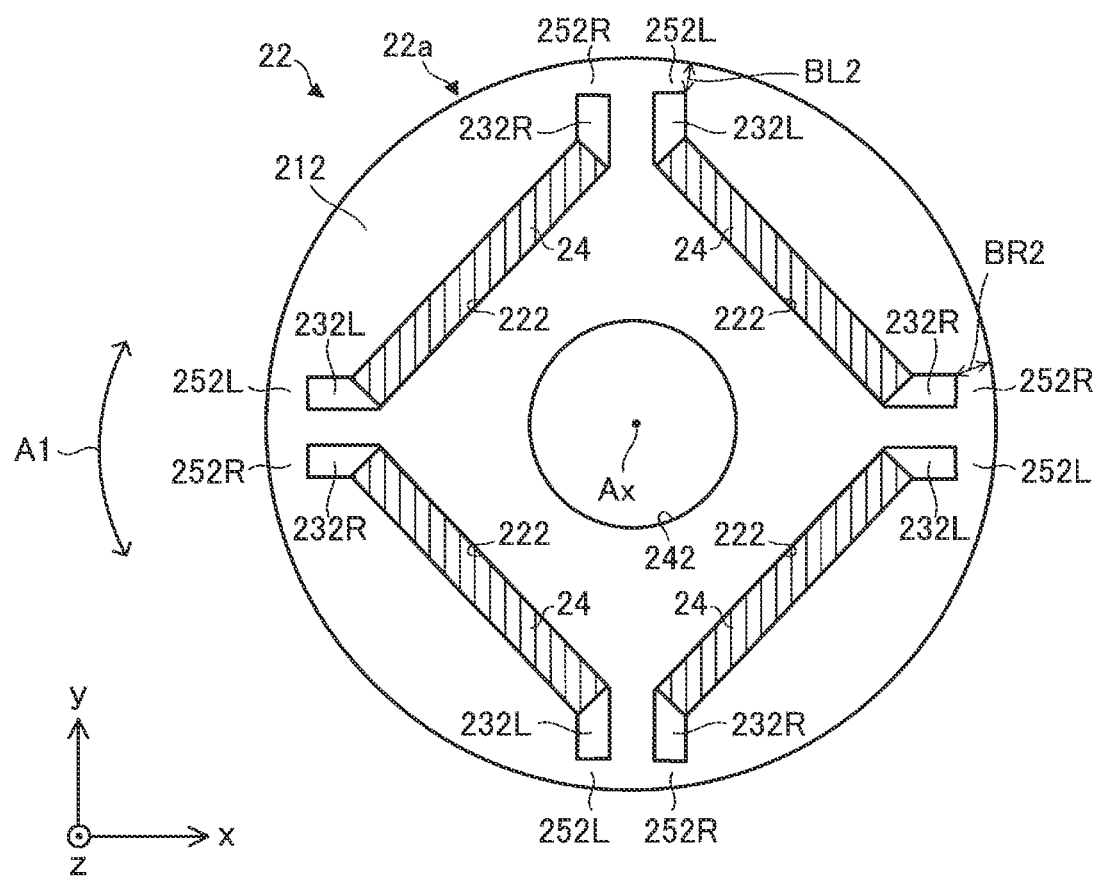
FIG. 15 is a plan view schematically illustrating still another example of the second rotor core.

FIG. 15 is a plan view schematically illustrating still another example of the second rotor core 22.

In an eighth variation, each first electrical steel sheet 211 of the first rotor core 21 includes one first magnet insertion hole 221 in each magnetic pole part of the first rotor core 21. In other words, each first electrical steel sheet 211 of the first rotor core 21 includes one magnet placement part in each magnetic pole part of the first rotor core 21. Each first electrical steel sheet 211 includes no first center bridges 271. One permanent magnet 24 is disposed in each first magnet insertion hole 221. In the xy plane, each first magnet insertion hole 221 extends straight in the longitudinal direction. That is, in the xy plane, each first magnet insertion hole 221 has a straight shape. Thus, in the xy plane, each permanent magnet 24 extends straight in the longitudinal direction, and has a straight shape.

In the example illustrated in FIG. 14, the first rotor core 21 includes no first slits 261. The first rotor core 21 may include first slits 261.

The first rotor core 21 in the eighth variation is the same as the first rotor core 21 described in the first embodiment except for the number of first magnet insertion holes 221, the shape of magnet placement parts, and the first center bridges 271.

Similarly, in the eighth variation, each second electrical steel sheet 212 of the second rotor core 22 has one second magnet insertion hole 222 in each magnetic pole part of the second rotor core 22. In other words, each second electrical steel sheet 212 of the second rotor core 22 includes one magnet placement part in each magnetic pole part of the second rotor core 22. Each second electrical steel sheet 212 includes no second center bridges 272. One permanent magnet 24 is disposed in each second magnet insertion hole 222. In the xy plane, each second magnet insertion hole 222 extends straight in the longitudinal direction. That is, in the xy plane, each second magnet insertion hole 222 has a straight shape. Thus, in the xy plane, each permanent magnet 24 extends straight in the longitudinal direction, and has a straight shape.

In the example illustrated in FIG. 15, the second rotor core 22 includes no second slits 262. The second rotor core 22 may include second slits 262.

The second rotor core 22 in the eighth variation is the same as the second rotor core 22 described in the first embodiment except for the number of second magnet insertion holes 222, the shape of magnet placement parts, and the second center bridges 272.

The eighth variation also has the advantages described in the first embodiment. For example, the electric motor 1 satisfies $(BL1 \times tL1 + BR1 \times tR1) > (BL2 \times tL2 + BR2 \times tR2)$. Accordingly, in high-speed rotation of the electric motor 1, it is possible to reduce magnetic flux leakage while maintaining mechanical strength of the rotor 2 to a centrifugal force generated in the first rotor cores 21 and the second rotor core 22. In particular, it is possible to reduce magnetic flux leakage in the second rotor core 22 while maintaining mechanical strength of the first rotor cores 21. As a result, efficiency of the electric motor 1 can be enhanced.

Second Embodiment

A compressor 6 according to a second embodiment of the present invention will be described.

Figure 16:
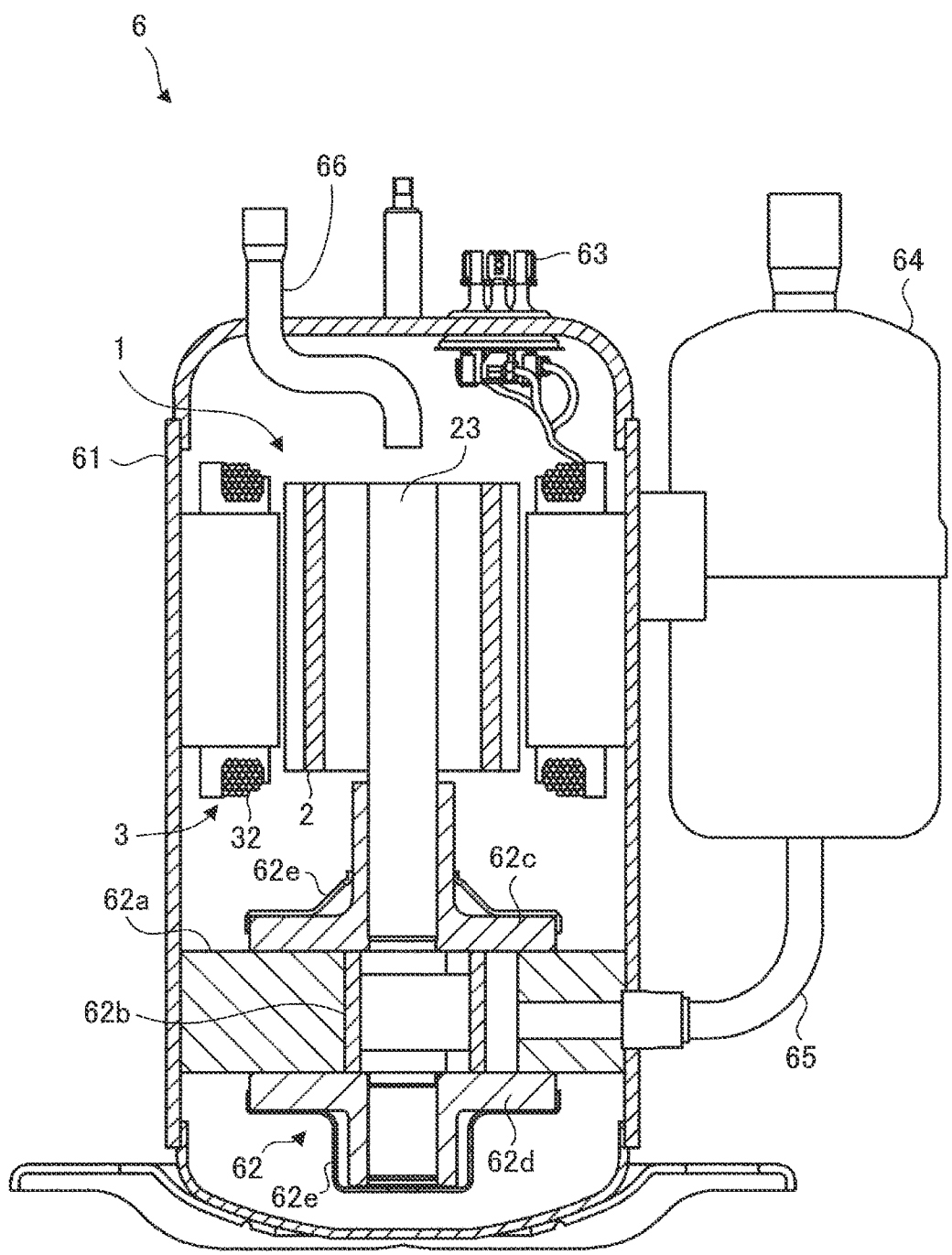
FIG. 16 is a cross-sectional view schematically illustrating a structure of a compressor according to a second embodiment of the present invention.

FIG. 16 is a cross-sectional view schematically illustrating a structure of the compressor 6 according to the second embodiment.

The compressor 6 includes an electric motor 1 serving as an electric element, a closed container 61 serving as a housing, and a compression mechanism 62 serving as a compression element (also referred to as a compression device). In this embodiment, the compressor 6 is a rotary compressor. It should be noted that the compressor 6 is not limited to the rotary compressor.

The electric motor 1 in the compressor 6 is the electric motor 1 described in the first embodiment. The electric motor 1 drives the compression mechanism 62.

The closed container 61 covers the electric motor 1 and the compression mechanism 62. The closed container 61 is a cylindrical container. Refrigerating machine oil for lubricating a sliding part of the compression mechanism 62 is stored in a bottom portion of the closed container 61.

The compressor 6 also includes a glass terminal 63 fixed to the closed container 61, an accumulator 64, a suction pipe 65, and a discharge pipe 66.

The compression mechanism 62 includes a cylinder 62a, a piston 62b, an upper frame 62c (also referred to as a first frame), a lower frame 62d (also referred to as a second frame), and a plurality of mufflers 62e attached to the upper frame 62c and the lower frame 62d. The compression mechanism 62 also includes a vane that divides the inside of the cylinder 62a into a suction side and a compression side. The compression mechanism 62 is disposed inside the closed container 61. The compression mechanism 62 is driven by the electric motor 1.

The electric motor 1 is fixed in the closed container 61 by press fitting or shrink fitting. The electric motor 1 may be attached directly to the closed container 61 by welding instead of press fitting or shrink fitting.

Coils of the electric motor 1 (e.g., the windings 32 described in the first embodiment) are supplied with electric power through the glass terminal 63.

A rotor 2 (specifically, one end of a shaft 23) of the electric motor 1 is rotatably supported by a bearing provided on each of the upper frame 62c and the lower frame 62d.

The shaft 23 is inserted in the piston 62b. The shaft 23 is rotatably inserted in the upper frame 62c and the lower frame 62d. The upper frame 62c and the lower frame 62d close an end face of the cylinder 62a. The accumulator 64 supplies a refrigerant (e.g., refrigerant gas) to the cylinder 62a through the suction pipe 65.

Next, an operation of the compressor 6 will be described. The refrigerant supplied from the accumulator 64 is sucked into the cylinder 62a from the suction pipe 65 fixed to the closed container 61. When the electric motor 1 rotates, the piston 62b fitted in the shaft 23 is thereby caused to rotate in the cylinder 62a. Accordingly, the refrigerant is compressed in the cylinder 62a.

The compressed refrigerant flows through the mufflers 62e and moves upward in the closed container 61. In this manner the compressed refrigeration is supplied to a high-pressure side of a refrigeration cycle through the discharge pipe 66.

A refrigerant such as R410A, R407C, or R22 can be used in the compressor 6. It should be noted that the refrigerant of the compressor 6 is not limited to these types of refrigerant. Examples of the refrigerant to be capable of using in the compressor 6 include refrigerants having small global warming potentials (GWPs) as follows:

(1) Halogenated hydrocarbon having a carbon double bond in its composition, such as hydro-fluoro-orefin (HFO)-1234yf ($CF3CF=CH2$), where HFO-1234yf has a GWP of 4;

(2) Hydrocarbon having a carbon double bond in its composition, such as R1270 (propylene), where R1270 has a GWP of 3, which is lower than that of HFO-1234yf, but has a flammability higher than that of HFO-1234yf; and (3) A mixture including at least one of halogenated hydrocarbon having a carbon double bond in its composition or hydrocarbon having a carbon double bond in its composition, such as a mixture of HFO-1234yf and R32. Since HFO-1234yf described above is a low-pressure refrigerant, a pressure loss tends to be large, and performance in a refrigeration cycle (especially, in an evaporator) tends to degrade. Thus, it is practically preferable to use a mixture with R32 or R41, which are higher-pressure refrigerant than HFO-1234yf.

The compressor 6 according to the second embodiment has the advantages described in the first embodiment.

The compressor 6 according to the second embodiment includes the electric motor 1 according to the first embodiment, and thus, efficiency of the compressor 6 can be enhanced.

Third Embodiment

A refrigeration air conditioning apparatus 7 serving as an air conditioner and including the compressor 6 according to the second embodiment will be described.

Figure 17:
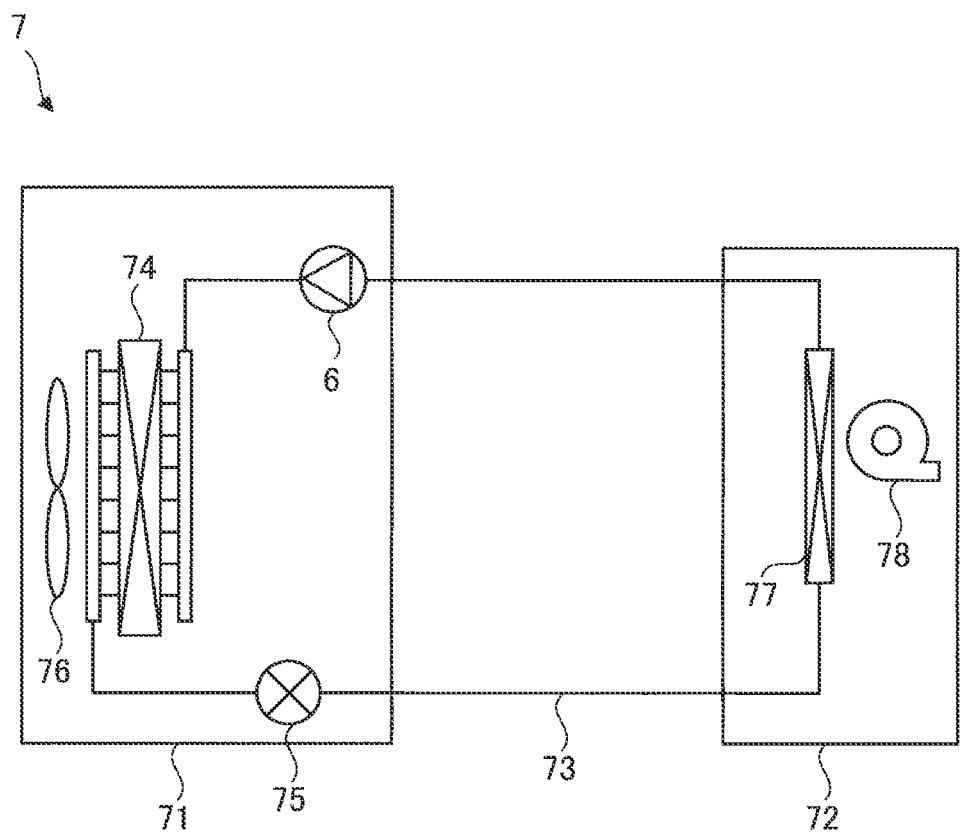
FIG. 17 is a diagram schematically illustrating a configuration of a refrigeration air conditioning apparatus according to a third embodiment of the present invention.

FIG. 17 is a diagram schematically illustrating a configuration of the refrigeration air conditioning apparatus 7 according to a third embodiment of the present invention.

The refrigeration air conditioning apparatus 7 is capable of performing cooling and heating operations, for example. A refrigerant circuit diagram illustrated in FIG. 17 is an example of a refrigerant circuit diagram of an air conditioner capable of performing a cooling operation.

The refrigeration air conditioning apparatus 7 according to the third embodiment includes an outdoor unit 71, an indoor unit 72, and a refrigerant pipe 73 connecting the outdoor unit 71 and the indoor unit 72 to each other.

The outdoor unit 71 includes a compressor 6, a condenser 74 as a heat exchanger, a throttling device 75, and an outdoor air blower 76 (also referred to as an "air blower"). The condenser 74 condenses a refrigerant compressed by the compressor 6. The throttling device 75 decompresses the refrigerant condensed by the condenser 74 to thereby adjust a flow rate of refrigerant. The throttling device 75 will be also referred to as a decompression device.

The indoor unit 72 includes an evaporator 77 as a heat exchanger, and an indoor air blower 78 (also referred to as an "air blower"). The evaporator 77 evaporates the refrigerant decompressed by the throttling device 75 to thereby cool indoor air.

A basic operation of a cooling operation in the refrigeration air conditioning apparatus 7 will now be described. In the cooling operation, a refrigerant is compressed by the compressor 6 and the compressed refrigerant flows into the condenser 74. The condenser 74 condenses the refrigerant, and the condensed refrigerant flows into the throttling device 75. The throttling device 75 decompresses the refrigerant, and the decompressed refrigerant flows into the evaporator 77. In the evaporator 77, the refrigerant evaporates, and the refrigerant (specifically a refrigerant gas) flows into the compressor 6 of the outdoor unit 71 again. When air is sent to the condenser 74 by the outdoor air blower 76, heat moves between the refrigerant and the air. Similarly, when air is sent to the evaporator 77 by the indoor air blower 78, heat moves between the refrigerant and the air.

The configuration and operation of the refrigeration air conditioning apparatus 7 described above are examples, and the present invention is not limited to the examples described above.

The refrigeration air conditioning apparatus 7 according to the third embodiment has the advantages described in the first and second embodiments.

In addition, since the refrigeration air conditioning apparatus 7 according to the third embodiment includes the compressor 6 according to the second embodiment, efficiency of the refrigeration air conditioning apparatus 7 can be improved.

As described above, preferred embodiments have been specifically described. However, it is obvious that those skilled in the art would take various modified variations based on the basic technical idea and teaching of the present invention.

Features of the embodiments and features of the variations described above can be combined as appropriate.

What is claimed is:

1. An electric motor comprising:
a rotor including at least one permanent magnet, a first rotor core having a first electrical steel sheet, and a second rotor core having a second electrical steel sheet, the rotor having a magnetic pole part formed by the at least one permanent magnet; and
a stator including a stator core and a winding fixed to the stator core, the stator being disposed outside the rotor, wherein
the first electrical steel sheet is located outside the stator core in an axial direction of the rotor,
the first electrical steel sheet includes
a first left flux barrier part and a first right flux barrier part respectively provided on both sides of the magnetic pole part in a circumferential direction of the rotor, in a plane perpendicular to the axial direction,
a first left bridge provided between the first left flux barrier part and an outer peripheral surface of the first rotor core, and
a first right bridge provided between the first right flux barrier part and the outer peripheral surface of the first rotor core,
the second electrical steel sheet includes
a second left flux barrier part and a second right flux barrier part respectively provided on both sides of the magnetic pole part in the circumferential direction, in the plane,
a second left bridge provided between the second left flux barrier part and an outer peripheral surface of the second rotor core, and
a second right bridge provided between the second right flux barrier part and the outer peripheral surface of the second rotor core, and
the electric motor satisfies $$BL1 > BL2, BR1 > BR2, \text{ and } (BL1 \times tL1 + BR1 \times tR1) > (BL2 \times tL2 + BR2 \times tR2),$$

where BL1 is a minimum width of the first left bridge in the plane, tL1 is a thickness of the first left bridge in the axial direction, BR1 is a minimum width of the first right bridge in the plane, tR1 is a thickness of the first right bridge in the axial direction, BL2 is a minimum width of the second left bridge in the plane, tL2 is a thickness of the second left bridge in the axial direction, BR2 is a minimum width of the second right bridge in the plane, and tR2 is a thickness of the second right bridge in the axial direction.

2. The electric motor according to claim 1, wherein
the at least one permanent magnet comprises two permanent magnets,
the first electrical steel sheet includes a first center bridge provided between the two permanent magnets,
the second electrical steel sheet includes a second center bridge provided between the two permanent magnets, and
the electric motor satisfies $$(BL1 \times tL1 + BR1 \times tR1 + BC1 \times tC1) > (BL2 \times tL2 + BR2 \times tR2 + BC2 \times tC2),$$

where BC1 is a minimum width of the first center bridge in the plane, tC1 is a thickness of the first center bridge in the axial direction, BC2 is a minimum width of the second center bridge in the plane, and tC2 is a thickness of the second center bridge in the axial direction.

3. The electric motor according to claim 2, wherein the electric motor satisfies BL1>BL2, BR1>BR2, BC1>BC2, and tL1=tR1=tC1=tL2=tR2=tC2.

4. The electric motor according to claim 2, wherein the electric motor satisfies BL1>BL2, BR1>BR2, BC1>BC2, tL1>tL2, tR1>tR2, and tC1>tC2.

5. The electric motor according to claim 1, wherein
the first electrical steel sheet and the second electrical steel sheet contain silicon, and
the electric motor satisfies Si1>Si2,
where Si1 [weight %] is a content of the silicon in the first electrical steel sheet, and Si2 [weight %] is a content of the silicon in the second electrical steel sheet.

6. The electric motor according to claim 1, wherein
the first left bridge is a non-magnetic material,
the first right bridge is a non-magnetic material,
the second left bridge is a non-magnetic material, the second right bridge is a non-magnetic material, and
a proportion of the non-magnetic material in a cross-sectional area of the second electrical steel sheet in the plane is larger than a proportion of the non-magnetic material in a cross-sectional area of the first electrical steel sheet in the plane.

7. The electric motor according to claim 1, wherein the electric motor is driven by inverter control.

8. A compressor comprising:
a closed container;
a compression device disposed in the closed container; and
the electric motor according to claim 1, to drive the compression device.

9. An air conditioner comprising:
the compressor according to claim 8; and
a heat exchanger.

10. An electric motor comprising:
a rotor including at least one permanent magnet, a first rotor core having a first electrical steel sheet, and a second rotor core having a second electrical steel sheet, the rotor having a magnetic pole part formed by the at least one permanent magnet; and
a stator including a stator core and a winding fixed to the stator core, the stator being disposed outside the rotor, wherein
the first electrical steel sheet is located outside the stator core in an axial direction of the rotor,
the first electrical steel sheet includes
a first left flux barrier part and a first right flux barrier part respectively provided on both sides of the magnetic pole part in a circumferential direction of the rotor, in a plane perpendicular to the axial direction,
a first left bridge provided between the first left flux barrier part and an outer peripheral surface of the first rotor core, and
a first right bridge provided between the first right flux barrier part and the outer peripheral surface of the first rotor core,
the second electrical steel sheet includes
a second left flux barrier part and a second right flux barrier part respectively provided on both sides of the magnetic pole part in the circumferential direction, in the plane,
a second left bridge provided between the second left flux barrier part and an outer peripheral surface of the second rotor core, and
a second right bridge provided between the second right flux barrier part and the outer peripheral surface of the second rotor core, and
the electric motor satisfies $$(BL1 \times tL1 + BR1 \times tR1) > (BL2 \times tL2 + BR2 \times tR2),$$

where BL1 is a minimum width of the first left bridge in the plane, tL1 is a thickness of the first left bridge in the axial direction, BR1 is a minimum width of the first right bridge in the plane, tR1 is a thickness of the first right bridge in the axial direction, BL2 is a minimum width of the second left bridge in the plane, tL2 is a thickness of the second left bridge in the axial direction, BR2 is a minimum width of the second right bridge in the plane, and tR2 is a thickness of the second right bridge in the axial direction, wherein
the at least one permanent magnet comprises two permanent magnets,
the first electrical steel sheet includes a first center bridge provided between the two permanent magnets, the second electrical steel sheet includes a second center bridge provided between the two permanent magnets, and
the electric motor satisfies $$(BL1 \times tL1 + BR1 \times tR1 + BC1 \times tC1) > (BL2 \times tL2 + BR2 \times tR2 + BC2 \times tC2),$$

where BC1 is a minimum width of the first center bridge in the plane, tC1 is a thickness of the first center bridge in the axial direction, BC2 is a minimum width of the second center bridge in the plane, and tC2 is a thickness of the second center bridge in the axial direction, wherein
the electric motor satisfies BL1=BL2=BR1=BR2=BC1=BC2, tL1>tL2, tR1>tR2, and tC1>tC2.

11. A compressor comprising:
a closed container;
a compression device disposed in the closed container; and
the electric motor according to claim 10, to drive the compression device.

12. An air conditioner comprising:
the compressor according to claim 11; and
a heat exchanger.

13. An electric motor comprising:
a rotor including two permanent magnets, a first rotor core having a first electrical steel sheet, and a second rotor core having a second electrical steel sheet, the rotor having a magnetic pole part formed by the two permanent magnets; and
a stator including a stator core and a winding fixed to the stator core, the stator being disposed outside the rotor, wherein
the first electrical steel sheet is located outside the stator core in an axial direction of the rotor,
the first electrical steel sheet includes
a first left flux barrier part and a first right flux barrier part respectively provided on both sides of the magnetic pole part in a circumferential direction of the rotor, in a plane perpendicular to the axial direction,
a first left bridge provided between the first left flux barrier part and an outer peripheral surface of the first rotor core, and
a first right bridge provided between the first right flux barrier part and the outer peripheral surface of the first rotor core, and
a first center bridge provided between the two permanent magnets,
the second electrical steel sheet includes
a second left flux barrier part and a second right flux barrier part respectively provided on both sides of the magnetic pole part in the circumferential direction in the plane, and
a second center bridge provided between the two permanent magnets, and
the second rotor core includes a plurality of outer peripheral surfaces that are separated from one another, and
the electric motor satisfies
BC1>BC2,
where BC1 is a minimum width of the first center bridge in the plane and BC2 is a minimum width of the second center bridge in the plane.

14. A compressor comprising:
a closed container;
a compression device disposed in the closed container; and the electric motor according to claim 13, to drive the compression device.

15. An air conditioner comprising:

the compressor according to claim 14; and a heat exchanger.

16. An electric motor comprising:

a rotor including two permanent magnets, a first rotor core having a first electrical steel sheet, and a second rotor core having a second electrical steel sheet, the rotor having a magnetic pole part formed by the two permanent magnets; and a stator including a stator core and a winding fixed to the stator core, the stator being disposed outside the rotor, wherein the first electrical steel sheet is located outside the stator core in an axial direction of the rotor, the first electrical steel sheet includes a first left flux barrier part and a first right flux barrier part respectively provided on both sides of the magnetic pole part in a circumferential direction of the rotor, in a plane perpendicular to the axial direction, a first left bridge provided between the first left flux barrier part and an outer peripheral surface of the first rotor core, a first right bridge provided between the first right flux barrier part and the outer peripheral surface of the first rotor core, and a first center bridge provided between the two permanent magnets, the second electrical steel sheet includes a second left flux barrier part and a second right flux barrier part respectively provided on both sides of the magnetic pole part in the circumferential direction in the plane, and a bridge provided between the second right flux barrier part and an outer edge of the second rotor core, the second right flux barrier part being provided on an upstream side in a rotation direction of the rotor, the second rotor core includes a plurality of outer peripheral surfaces that are separated from one another, and the electric motor satisfies

BR1>BR2, where BR1 is a minimum width of the first right bridge in the plane and BR2 is a minimum width of the bridge of the second electrical steel sheet in the plane.

17. A compressor comprising:

a closed container;

a compression device disposed in the closed container; and the electric motor according to claim 16, to drive the compression device.

18. An air conditioner comprising:

the compressor according to claim 17; and a heat exchanger.

* * * * *